(12) United States Patent
Pavao Moreira et al.

(10) Patent No.: US 12,250,570 B2
(45) Date of Patent: Mar. 11, 2025

(54) SYSTEM AND METHOD FOR COMBINED PERFORMING OF WIRELESS COMMUNICATION AND SENSING

(71) Applicant: NXP B. V., Eindhoven (NL)

(72) Inventors: Cristian Pavao Moreira, Frouzins (FR); Alphons Litjes, Zijtaart (NL); Alexander Vogt, Hamburg (DE)

(73) Assignee: NXP B.V., Eindhoven (NL)

( * ) Notice: Subject to any disclaimer, the term of this patent is extended or adjusted under 35 U.S.C. 154(b) by 354 days.

(21) Appl. No.: 17/932,966

(22) Filed: Sep. 16, 2022

(65) Prior Publication Data

US 2023/0122173 A1 Apr. 20, 2023

(30) Foreign Application Priority Data

Oct. 18, 2021 (EP) .................................. 21306456

(51) Int. Cl.
*H04W 24/02* (2009.01)
*H04W 24/10* (2009.01)
(Continued)

(52) U.S. Cl.
CPC .................................. *H04W 24/02* (2013.01)

(58) Field of Classification Search
None
See application file for complete search history.

(56) References Cited

U.S. PATENT DOCUMENTS

| | | | |
|---|---|---|---|
| 8,155,033 B2 | 4/2012 | Chaudhri et al. | |
| 8,804,856 B2 * | 8/2014 | Verhelst | H04B 17/16 375/259 |

(Continued)

FOREIGN PATENT DOCUMENTS

| | | |
|---|---|---|
| CN | 106546980 B | 9/2018 |
| EP | 3451015 A1 | 3/2019 |

(Continued)

OTHER PUBLICATIONS

3GPP TS 38.211, "3rd Generation Partnership Project; Technical Specification Group Radio Access Network; NR; Physical Channels and Modulation" specification, Release 16, V16.1.0 (Mar. 2020) pp. 1-130.

(Continued)

*Primary Examiner* — Pablo N Tran

(57) ABSTRACT

Systems and methods for performing both wireless communications and wireless sensing in combination are disclosed herein. In one example embodiment, the system includes a base station (BS) including each of at least one antenna device including a first antenna device and at least one control unit. The control unit includes an input port coupled at least indirectly to the first antenna device, an output port, and a controllable circuit including each of a spillover cancellation circuit and a bypass circuit. The BS is configured to operate in each of a communication mode and a sensing mode. When the BS operates in the sensing mode, the spillover cancellation circuit of the controllable circuit is enabled and performs spillover cancellation. When the BS operates in a communication mode, the bypass circuit operates so that the spillover cancellation circuit is bypassed or otherwise does not affect how the output signal is generated.

20 Claims, 9 Drawing Sheets

(51) Int. Cl.
*H04W 72/12* (2023.01)
*H04W 74/08* (2024.01)

(56) References Cited

U.S. PATENT DOCUMENTS

| | | | | |
|---|---|---|---|---|
| 9,791,551 | B1* | 10/2017 | Eshraghi | G01S 7/038 |
| 9,971,414 | B2 | 5/2018 | Gollakota et al. | |
| 10,006,987 | B2 | 6/2018 | Pavao-Moreira et al. | |
| 10,103,772 | B2* | 10/2018 | Pehlke | H03F 3/72 |
| 10,560,214 | B2 | 2/2020 | Lupescu et al. | |
| 10,686,639 | B2 | 6/2020 | Bose et al. | |
| 10,764,832 | B2 | 9/2020 | Comsa et al. | |
| 10,772,046 | B2 | 9/2020 | Hwang et al. | |
| 2008/0060024 | A1* | 3/2008 | Decanne | H04H 20/61 |
| | | | | 725/63 |
| 2016/0020737 | A1* | 1/2016 | Kong | H01Q 21/28 |
| | | | | 330/250 |
| 2016/0352374 | A1* | 12/2016 | Wloczysiak | H04B 1/10 |
| 2020/0103498 | A1 | 4/2020 | Frank et al. | |
| 2020/0154364 | A1 | 5/2020 | Rahman et al. | |
| 2020/0229102 | A1 | 7/2020 | Gubeskys et al. | |
| 2020/0271753 | A1 | 8/2020 | Va et al. | |
| 2021/0195435 | A1 | 6/2021 | Rimini et al. | |
| 2022/0030440 | A1 | 1/2022 | Park et al. | |
| 2023/0117789 | A1* | 4/2023 | Vogt | H04W 72/12 |
| | | | | 370/329 |
| 2023/0194656 | A1* | 6/2023 | Song | G01S 7/285 |
| | | | | 342/175 |
| 2023/0344390 | A1* | 10/2023 | Medra | H03G 1/0088 |
| 2023/0361464 | A1 | 11/2023 | Litjes et al. | |

FOREIGN PATENT DOCUMENTS

| | | |
|---|---|---|
| EP | 3545335 A1 | 10/2019 |
| IN | 201647034086 A | 11/2016 |
| WO | 2018/097817 A1 | 5/2018 |
| WO | 2021085768 A1 | 5/2021 |

OTHER PUBLICATIONS

3GPP TS 38.211, "3rd Generation Partnership Project; Technical Specification Group Radio Access Network; NR; Physical Channels and Modulation" specification, Release 16, V16.2.0 (Jun. 2020) pp. 1-108.

3GPP TS 38.211, "3rd Generation Partnership Project; Technical Specification Group Radio Access Network; NR; Physical Channels and Modulation" specification, Release 16, V16.6.0 (Jun. 2021) pp. 1-134.

Sharetechnote, "5G/NR—Frame Structure," website (2017) 23 pages, https://www.sharetechnote.com/html/5G/5G_FrameStructure.html.

Barneto, Carlos Baquero et al., "High-Accuracy Radio Sensing in 5G New Radio Networks: Prospects and Self-Interference Challenge", 53rd Asilomar Conference on Signals, Systems, and Computers, Nov. 3, 2019, pp. 1159-1163.

Barneto, Carlos Baquero et al., Full-Duplex OFDM Radar With LTE and 5G NR Waveforms: Challenges, Solutions, and Measurements, IEEE Transactions on Microwave Theory and Techniques, Oct. 1, 2019, pp. 4042-4054, vol. 67, No. 10.

Kolodziej, Kenneth E. et al., "Adaptive Learning Rate Tuning Algorithm for RF Self-Interference Cancellation", IEEE Transactions on Microwave Theory and Techniques, Mar. 1, 2021, pp. 1740-1751, vol. 69, No. 3.

Tang, Aimin et al., "Self-Interference-Resistant IEEE 802.11ad-Based Joint Communication and Automotive Radar Design", IEEE Journal of Selected Topics in Signal Processing, Nov. 1, 2021, pp. 1484-1499, vol. 15, No. 6.

U.S. Appl. No. 17/932,802; Title: "System and Method for Combined Performing of Wireless Communication and Sensing"; Inventor: Alexander Vogt et al.; filed Sep. 16, 2022.

Fran Liu et al.: Joint Radar and Communication Design: Applications, State-of-the-Art, and the Road Ahead, in IEEE Transactions on Communications, vol. 68, No. 6, pp. 3834-3862, Jun. 2020.

Thorsten Wild et al.: "Joint Design of Communication and Sensing for Beyond 5G and 6G Systems," in IEEE Access, vol. 9, pp. 30845-30857, Feb. 15, 2021.

* cited by examiner

FIG. 3B

SYSTEM AND METHOD FOR COMBINED PERFORMING OF WIRELESS COMMUNICATION AND SENSING

CROSS-REFERENCE TO RELATED APPLICATIONS

This application claims priority under 35 U.S.C. § 119 to European Patent Application No. 21306456.1, filed on Oct. 18, 2021, the contents of which are incorporated by reference herein.

FIELD OF THE DISCLOSURE

The present disclosure relates to wireless communication systems and methods such as, for example, cellular communication systems and methods, as well as wireless sensing systems and methods such as, for example, radar sensing systems, and more particularly relates to systems and methods in which both wireless communications and sensing can be performed together or in combination by way of a single system or method.

BACKGROUND OF THE DISCLOSURE

Modern wireless communication standards (from 5G onwards) extend operating frequencies to millimeter (mm) wave frequencies (e.g., >20 GHz). At such high frequencies, the wireless signals that are transmitted or received by communication systems not only can be used to perform wireless communications, but also are suitable for accurate range and velocity sensing on top of wireless communications. Indeed, radar services/functionality for range and velocity sensing is expected to be incorporated in 5G and 6G wireless communication systems and is currently being developed for WiFi 6. Yet, notwithstanding the possibility of performing both wireless communications and radar sensing by way of a single wireless communication system, there exist various impediments to achieving such operations in combination with one another in an effective manner.

First, the minimum velocity resolution that can be achieved when performing radar sensing is dependent on the observation time. Long observation times (e.g., 5 milliseconds) are appropriate if one wishes to attain sufficient velocity resolution (e.g., 1 Km/h) to allow for the reliable detection of certain types of targets, such as pedestrians or crowds. However, if wireless communications by a wireless communication system are interrupted or deferred to allow for radar sensing to occur over such long observation times, this will translate to increased (and likely excessive) latency in terms of the wireless communications operations of the wireless communication system (for example, a latency target for 6G is less than one millisecond). That is, long observation times are needed to achieve low speed resolution, but such long observation times can jeopardize communication effectiveness, in terms of latency.

An additional challenge associated with achieving both wireless communications and radar sensing in combination is that it is often desirable to have a broad field of view (FOV) when performing radar sensing. With this being the case, performing accurate radar sensing in combination with wireless communication not only can involve excessive latency, but also can be complicated by a need to perform radar sensing/scanning in many directions at a given time so as to achieve a broad FOV. In particular, scanning a desired broad FOV in a complete manner can increase sampling time to an excessive extent.

Although various options are known for accomplishing both wireless communications and also radar sensing in combination, such conventional options suffer from a number of disadvantages. In particular, scaling up a wireless communication system to perform accurate radar sensing is known, but can be cost prohibitive. For example, utilizing 5 base stations (BSs) at 100% load or a single (1) BS having 5 electromagnetic beams each at 100% can be excessively costly. Further, although scaling down a wireless communication system to attain a better fit on BS loading is also known, but this can result in a loss of tracking accuracy (e.g., in terms of speed detection). For example, if one reduces a system update rate by 50 times, then it can take 50 seconds to reach acceptable BS loading. Additionally, it is also known to perform geometrical optimization (e.g., multiplying by a factor of 2), but this is insufficient in terms of achieving enough velocity resolution. For example, reducing elevation/number of steps according to BS location is insufficient for providing accurate sensing.

For at least one or more of these reasons, or one or more other reasons, it would be advantageous if new or improved systems and methods could be developed for achieving wireless communications in combination with wireless sensing, so as to address any one or more of the concerns discussed above or to address one or more other concerns or provide one or more benefits.

BRIEF DESCRIPTION OF THE DRAWINGS

FIG. 3B shows an example slot format table that includes a plurality of rows having different example arrangements of symbols that can be performed during slots as represented in FIG. 3A;

DETAILED DESCRIPTION

Figure 1:
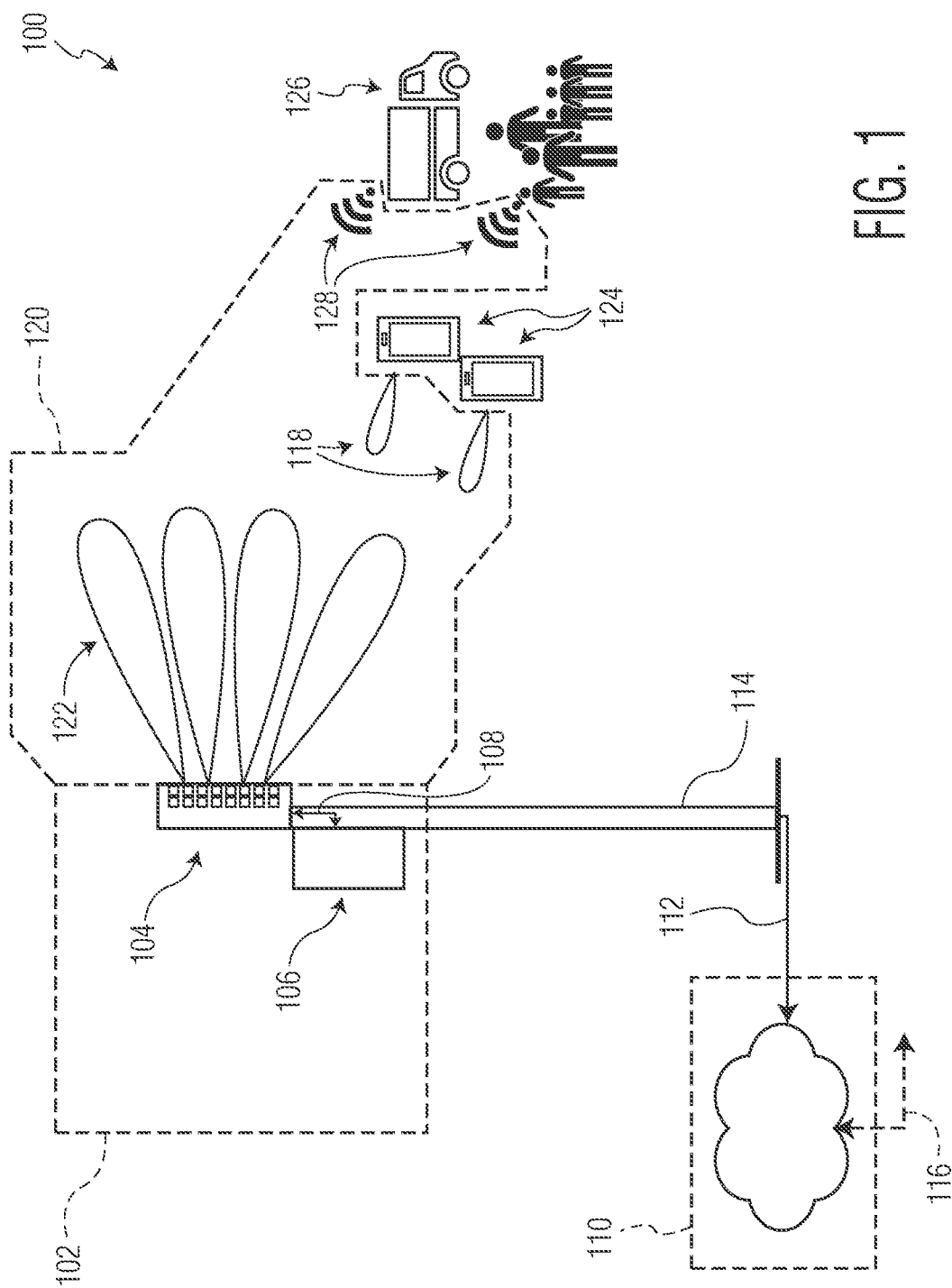
FIG. 1 is a block diagram showing an improved system, including a base station (BS), that is configured to perform both wireless communications and radar sensing in combination, in a substantially concurrent or contemporaneous manner, in accordance with a first example embodiment.

The present disclosure relates to systems and methods for performing sensing (e.g., radar sensing) in combination with wireless (e.g., cellular) communication. The methods can include dynamically operating a base station (BS) or portions thereof (e.g., a receiver circuit) to interleave communication and sensing functionality on sub-frame level, so as to combine sensing with wireless communication in a time-multiplexed manner. In at least some embodiments, the methods can be performed by a BS operating at mm Wave frequencies, for example, in accordance with 5G, 6G, WiFi, and/or other (e.g., subsequent-generation) wireless communication technology standards.

In at least some embodiments, the systems and methods encompassed herein operate by dynamically allocating or interleaving sensing time slot portions among communication time slot portions provided in accordance with a communication standard (e.g., 3GPP 38.211), in a structured manner Because very short time slot portions—referred to herein as "symbols"—are present in the communication standards, such slot portions can be dynamically allocated to achieve sensing functionality in a sparse manner that fulfils the minimum requirements of the chosen sensing method and at the same time allows for use of the remaining slot portions to maintain communication quality (e.g., in terms of bandwidth and latency). Accordingly, such methods allow for flexible slot portion allocation, at a communication standard level, such that slot portion allocation is optimized to achieve the interleaving of both communication and radar sensing operations in a manner that allows for various goals to be satisfied.

By allocating time slot portions designated for sensing with time slot portions designated for communications in an interleaved manner, sensing capability can be introduced into BSs or other systems (including possibly some existing communications systems or solutions) that might otherwise be suited only for performing communications. Further, by appropriately designating certain ones of the time slot portions to serve as sensing time slot portions, and interleaving such sensing time slot portions with other time slot portions for communication (e.g., within a sub-frame), a base station (BS) can scan a field of view (FOV) with a given recurrence that is sufficient to achieve one or more desired goals. Among other things, scanning of a complete FOV can be completed under a given system time, while maintaining communication quality. In at least some embodiments, time slot portions for radar sensing can be interleaved with time slot portions for communication (within a communication sub-frame) and also beam direction can be changed sequentially on each of the radar sensing time slot portions so as to scan the complete FOV in a given scanning time.

To achieve such multiple goals, optimized radar slot/symbol allocation within communication frames or sub-frames—such as allocation to achieve appropriate spacing between each of the successive radar slots/symbols—can be selected in accordance with any one or more goals or requirements that may pertain to the sensing of anticipated target(s). For example, such allocations can be determined based upon speed resolution goals or requirements as well as the expected maximum speed of any target(s) that will be sensed by way of the radar sensing, and also selected in accordance with the FOV to be covered (e.g., the extent of the region with which it will be desired to sense target(s), such as can be defined by elevation and azimuth). With appropriate allocation of time slot portions, sensing can be achieved that is sufficient for certain use cases or services (e.g., to detect the presence or movement of people, a crowd, or cars, or for capacity planning) or for various circumstances such as various times (e.g., morning or evening).

Among other things, slot portions allocated for radar sensing can be spread in time to allow for accurate determinations regarding the velocity of targets, for example, by performing a Doppler Fast Fourier Transform (FFT) on the (accumulated) sensed radar signal information obtained during those slot portions (symbols). An allocation of time slot portions for sensing and communication operations can be made according to the velocity resolution for a particular use case (e.g. 1 km/h for roadside safety). That is, an allocation scheme can be set to satisfy the requirements for a particular radar/sensing use case, which can, for example, require sampling to enable a following FFT to determine target velocities.

In addition to allowing for communication time slot portions (or symbols) and radar sensing time slot portions (or symbols) to be allocated in a flexible manner to fulfill different use case requirements, such methods also allow for the satisfaction of communication requirements such as maximum latency. Further, the methods can allow for flexibly changing the duty cycle of sensing operation relative to communication operation, and can enable telecom providers to trade off excess communication bandwidth with increased sensing capabilities. By appropriately interleaving slot portions designated for sensing with other slot portions designated for communications, a link budget of the BS (or BS output power) can be dynamically adapted so as to allow for optimal sensing coverage or to reduce BS power consumption when high output power is not required in sensing slot portions. This permits a desired balance to be achieved between communication service quality (e.g., in terms of bandwidth and latency) and sensing (e.g., in terms of performance/priority).

It should be appreciated that the particular allocation of time slot portions for sensing and communication operations can vary widely depending upon the use case or operational circumstance. In at least some embodiments encompassed herein, the methods employ flexible allocation schemes that permit balancing sensing and communication use cases on various levels of controllers from 100% communication (which would be a conventional use of wireless communications according to a typical wireless communication standard) to 100% sensing, for example in emergencies when a clear view of the surroundings of a base station is required. For a typical use case, however, it will often be appropriate to have a low duty-cycle of sensing (relative to all time slot portions including communication time slot portions) to ensure low-latency communication while maintaining good radar coverage.

For example, as mentioned above, an allocation of time slot portions for sensing and communication operations can be made according to the velocity resolution for a particular use case (e.g. 1 km/h for roadside safety). In such an example, the range resolution and maximum velocity required for the use case (e.g., 0.5 m and 200 km/h for roadside safety) can dictate how long a single radar pulse sequence or chirp is. Typically, this will result in much smaller sequence lengths than are available in total. In other words, there exists excess time that can be better used for communication. Additionally, by choosing appropriate coding schemes for a pulse sequence, multiple beams of a BS (and even of multiple BSs) can be used at the same time to further increase the sensing quality.

Further, in at least some embodiments encompassed herein, the systems and methods include additional features to facilitate (or make possible) the performing of both wireless communication and radar sensing in combination as described above. In this regard, the present inventors have recognized that, in many conventional radar sensing systems, the radar transmitter and receiver operate simultaneously, in a duplex manner, and radar sensing of a target operates by way of correlation from output to input (e.g., due to the target's reflection). Due to limited isolation between the transmission and reception, false reflections due to cross coupling can result in false sensing of targets (that is, false or non-existent targets incorrectly are detected). To alleviate such problems, such conventional radar sensing systems often employ active cancellation in the receiver to avoid a spillover effect (e.g., to avoid leakage of a transmit/TX signal to a receive/RX signal) that might saturate the receiver.

Additionally, the present inventors have further recognized that conventional cellular communications between a BS and other communication device(s) (e.g., mobile devices) occurs in a different manner than such conventional radar sensing systems. More particularly, conventional cellular communication systems typically operate in a manner according to which, at any given time, either transmitting or receiving by the BS occurs (but not both), in a simplex manner Such conventional cellular communication systems are not designed to address concerns about cross coupling from transmission to reception, the sensing of false targets, and/or associated system overloading (saturation of the dynamic range). Indeed, spillover cancellation as employed with radar sensing is generally unsuitable for such conventional cellular communication systems.

In view of such concerns about spillover and the unsuitability of spillover cancellation, the present disclosure also includes at least some embodiments of systems and methods in which bypass circuitry is employed in addition to spillover cancellation circuitry. The bypass circuity, which effectively serves as a bypass around the spillover cancellation circuitry, can be dynamically operated by an overall communication and sensing system controller (e.g. the modem). In at least some such embodiments, the systems and methods operate in different manners at different respective time slot portions depending upon whether communication or radar sensing is occurring during the respective time slot portions.

More particularly in some such systems and methods, during a wireless communication mode of operation, a spillover cancellation circuit can be bypassed and reset and, during a radar sensing mode of operation, the cancellation provided by the spillover cancellation circuit can be enabled or reactivated. Such systems and methods can operate to configure the BS according to the selected operating mode of the BS (that is, whether the operating mode is the radar sensing mode or wireless communication mode) in a manner that combines sensing and communication functionality in the time domain. Further in this regard, such systems and methods can operate to configure the receiver into a defined state according to the application used in the time slot portion via one or more control signals sent from a controller (e.g., the edge or modem) to the antenna panel.

Additionally in some such embodiments, if sensing and communication are performed in a manner involving time division multiplexing as described herein, some time slot portions can be reserved for beam forming operation before switching from one operating mode to the other (that is, before switching from wireless communication operation to radar sensing operation, or vice-versa). When switching from radar sensing operation to wireless communication operation, such time slot portions that are reserved for beam forming operation can also be utilized to program the receiver of the BS to reset and bypass the spillover cancellation to avoid losing information. Also, when switching from wireless communication operation to radar sensing operation, during such time slot portions that are reserved for beam forming operation, receiver cancellation can be enabled again to remove strong interference due to the spillover effect.

With such operation, it is possible to utilize the same receiver hardware for both the radar sensing mode of operation and the wireless communication mode of operation, in a manner that is optimized for each of these modes of operation. Also, by using the flexible time slot portions associated with beam forming (during which no communication or sensing data is transmitted) in this manner, it is possible to program the spillover cancellation of a receiver between the times at which the BS is operating in the wireless communication and radar sensing modes of operation. Therefore, cancellation is 'bypassed' when the receiver operates in wireless communication mode of operation, and cancellation is "activated" when the receiver operates in the radar sensing mode of operation.

Referring to FIG. 1, a block diagram shows a system 100 that is configured to perform both wireless communications and radar sensing in a substantially concurrent or contemporaneous manner, in accordance with a first example embodiment encompassed herein. As shown, the system 100 includes a base station (BS) 102 that includes a plurality of antenna in package (AiP) devices 104 that respectively include antennas and beamformers. Additionally, the BS 102 also includes a remote radio unit (RRU) 106 that serves as a controller or control unit for the BS, and that includes both a modem and an edge processing device. The modem can perform modulation and demodulation, as well as other types of processing, and the edge processing device can perform protocol control and other processing. In the present embodiment, as discussed in further detail below with respect to FIG. 6 and FIG. 7, the RRU 106 allows for spillover cancellation operation as well as spillover cancellation bypass operation. The RRU 106 is in communication with the AiP devices 104, within the BS 102, by way of one or more communication links 108.

Further, the system 100 additionally can be considered to include a cloud 110 that can be, and typically is, remotely located apart from the BS 102. The BS 102 engages in communications with the cloud 110 by way of one or more communication links 112 that can be wired or wireless communication links. In the present illustration, the BS 102 is supported upon (and/or can be understood as including) a support structure 114, which can for example take the form of a pole. The communication links 112 are shown extend from the RRU 106 to the cloud 110 via the support structure 114, although the communication links need not extend along the support structure in other embodiments. The cloud 110 can take any of a variety of forms depending upon the embodiment and, for example, can include a plurality of computer processors and storage devices. As represented by one or more additional communication links 116, the cloud 110 can also be in communication with one or more other BSs or other devices (not shown). Accordingly, the cloud 110 can serve to perform monitoring of, as well as control of, multiple BSs including the BS 102.

The system 100 further can be considered to include a radio frequency (RF) interface 120 by which the BS 102 both conducts wireless communications and performs radar sensing. The RF interface 120 particularly can be understood to include the wireless or electromagnetic fields or signals by which the BS 102 is in communication or contact with other devices, structures, or objects as described further below. Although the term RF interface 120 is utilized herein, the interface provided by such wireless or electromagnetic fields or signals can alternatively be referred to by other terms such as, for example, an antenna interface, or further for example, an air (or air gap) interface when the wireless or electromagnetic fields or signals are transmitted through the air or atmosphere (it should be appreciated that such fields or signals can also be transmitted within other physical environments or by way of other media or also transmitted through a vacuum). Among other things, in the present embodiment, the RF interface 120 includes electromagnetic beams 122 that are generated by the AiP device 104s. In the present example, there are shown to be four of the electromagnetic beams 122. Nevertheless, depending upon the embodiment, any one or more electromagnetic beams can be generated and often many more than four electromagnetic beams can be generated by the AiP devices 104. In embodiments such as the present embodiment in which there are multiple ones of the electromagnetic beams 122, one or more of those electromagnetic beams can be utilized for communication purposes simultaneously (or substantially simultaneously) while one or more others of those electromagnetic beams are utilized for radar sensing purposes.

With respect to the generation of the electromagnetic beams 122, in the present embodiment the BS 102 employs phase-coded microwave waveform (PCMW) radar technology, which is well suited for integration into current cellular communication standards and is compatible with current 5G (as well as 6G) hardware (HW). The electromagnetic beams 122 are used both to achieve wireless communications with other communication devices 124 such as mobile devices, and also to detect or sense the presence of other structures 126. The other communication devices 124 are intended to be representative of any of a variety of different types of mobile devices or other wireless communication devices including, for example, mobile phones, cellular phones, or laptop computers. The other communication devices 124 are often held by, or associated with, end users, and in this sense can be considered to be end user devices or considered to be representative of end users themselves.

The other structures 126 can include any of a variety of devices, systems, apparatuses, or objects with which the BS 102 does not engage, or is not presently engaging, in wireless communications. The other structures 126 for example can include both inanimate (e.g., vehicles) and animate (e.g., people) objects. In some circumstances, one of more of the other communication devices 124 can be included among the other structures 126, such as when those other communication devices are shut off and not engaging in wireless communications with the BS 102.

With respect to the wireless communications between the BS 102 and the other communication device 124, it should be recognized that such wireless communications includes both transmissions from the BS 102 to the other communication devices 124 as represented by the electromagnetic beams 122, as well as transmissions from the other communication devices back to the BS 102, which are illustrated in FIG. 1 as additional electromagnetic beams 118. That is, the other communication devices 124 are active targets that send transmissions to the BS 102 in addition to the transmissions sent by the BS 102. The transmissions from the BS 102 to the other communication devices 124 can be referred to as downlink (DL) communications and the transmissions from the other communication devices 124 back to the BS 102 can be referred to as uplink (UL) communications. It should be appreciated that the RF interface 120, in addition to including the electromagnetic beams 122, also can be considered to include the additional electromagnetic beams 118.

With respect to the radar sensing performed by the BS 102, the other structures 126 are passive targets that do not generate their own transmissions. Accordingly, such radar sensing includes both the sending of sensing signals from the AiP devices 104 outward from the BS 102 toward the other structures 126, and the receiving of reflections of those sensing signals back from the other structures 126. The sending of sensing signals from the AiP devices 104 again is represented in FIG. 1 by the electromagnetic beams 122 included by the RF interface 120. Further, the reflections of those sensing signals off of the other structures 126 that are in turn received by the AiP devices 104 are illustrated in FIG. 1 as reflected signals 128, which can also be considered to form part of the RF interface 120.

In the present embodiment, the wireless communications between the BS 102 and the other communication devices 124 occur in a simplex manner That is, the DL transmissions from the BS 102 to the other communication devices 124 generally occur at different times than the UL transmissions from the other communication devices 124 to the BS 102. In contrast, during radar sensing, the sending of sensing signals from the AiP devices 104 and receiving of the reflected signals 128 generally occur in a duplex manner in which there is coherent transmission and reception. That is, the receiving of respective ones of the reflected signals 128 can occur at the same or substantially the same times, respectively, as the sending of respective ones of the sensing signals that give rise to those respective reflected signals. (In alternate embodiments encompassed herein, however, it is also possible that the wireless communications between the BS 102 and the other communication devices 124 can occur in a duplex manner.)

For purposes of the present description, the RF interface 120, other communication devices 124, other structures 126, and cloud 110 all constitute parts of the system 100 in addition to the BS 102 (and possibly one or more other BSs with which the cloud is also in communication). However, it should be appreciated that the extent of the system 100 can be defined differently depending upon the embodiment or circumstance. For example, the system 100 can be understood to include only the BS 102 and the cloud 110 (and possibly one or more other BSs with which the cloud is also in communication), or alternatively understood to include only the BS 102. In at least some embodiments encompassed herein, the methods of performing both wireless communications and radar sensing, in a substantially concurrent or contemporaneous manner, primarily (or exclusively) involve operations or manners of operation performed by the BS 102.

Figure 2:
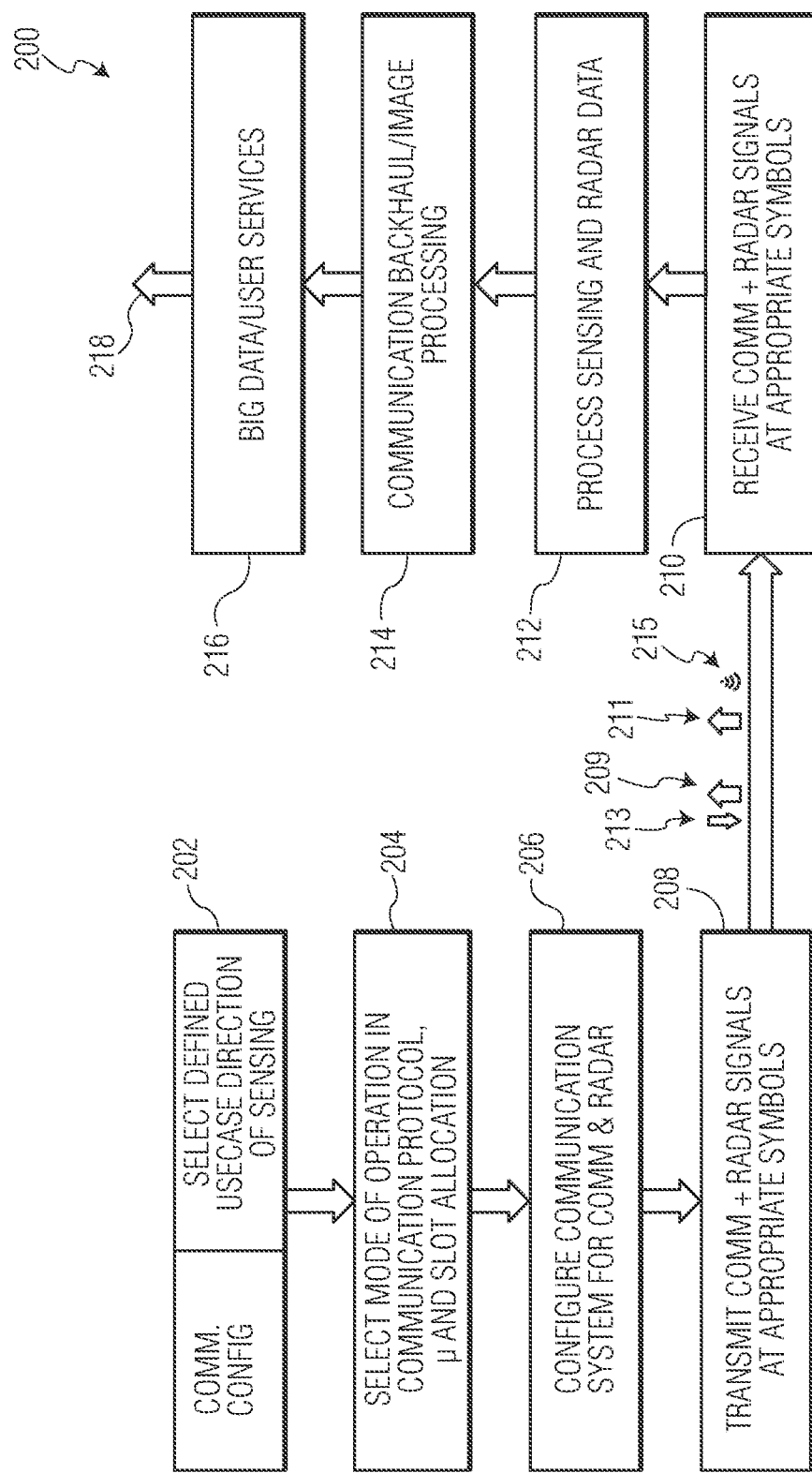
FIG. 2 is a flow chart showing example steps of a method of operation of the system of FIG. 1, according to which the system performs both wireless communications and radar sensing in combination, in a substantially concurrent or contemporaneous manner.

Turning next to FIG. 2, a flow chart 200 shows example steps of a method or process of operation of the system 100 according to which the system 100 performs both communications and radar sensing in a substantially concurrent or contemporaneous manner, by way of time-multiplexing communication operations and radar sensing operations.

As shown, the method begins at a step 202 at which one or more determinations are made about appropriately configuring the system 100 for both wireless communications and also radar sensing and, based upon those one or more determinations, the system is appropriately configured. In some embodiment including the present embodiment, such configuration can take into account, among other things, a selected defined use case and/or one or more appropriate directions of sensing—for example, directions of sensing that are suitable for that use case. Also, in some such embodiments, the parameters for the BS 102 used for radar sensing slot portions (e.g., phase, power, or consumption) are configured according to sensing use case requirements (e.g., max range, max velocity, and associated resolutions). The parameters that are configured in regard to radar sensing operation are typically independent of the parameters for wireless communication operation. Selection of different parameters can be determined by a look-up table (LUT) stored at the AiP level, depending on radar/communication programmed profile(s).

Indeed, the present disclosure envisions that the system 100 can be utilized or operated in accordance with any of a variety of use cases in which the system performs both wireless communications and radar sensing, where the system is configured for any such use cases as appropriate depending upon the embodiment or circumstance. In this regard, a first example use case is a smart network use case in which communications or network operations of the system are adjusted based upon environmental circumstances that are sensed. Further for example, the system 100 may sense the presence of an obstruction that may limit or undermine communications capabilities relative to a given mobile device (e.g., a person holding the mobile device may be heading in a direction where the mobile device may pass behind a tree or a wall that may restrict communications with that mobile device). In such a circumstance, based upon the information regarding the presence of the obstruction, the system 100 can adjust whether communications with the given mobile device are conducted via a first BS such as the BS 102 or a different BS.

Additionally, a second example use case involves utilizing the system 100 not only to perform communications with the other communication devices 124 but also to sense the presence or movement of other objects or structures that can present hazards or risks, such as vehicles or obstructions along or on a road or at an intersection. Such operation can potentially enhance traffic flow, or reduce the likelihood or frequency of undesirable traffic accidents or incidents. Further, additional example use cases can involve utilizing the system 100 not only to perform communications with the other communication device 124 but also to sense or detect the presence or movement of people, for example, within crowded venues such as stadiums or conference centers, and/or intrusions. Such operations can be performed both in outdoor circumstances (e.g., in an open-air stadium) as well as indoors, and can potentially enhance crowd control efforts, allow for capacity planning or intrusion detection, and/or prevent or reduce the likelihood of collisions.

It will be appreciated from the above description that, in at least some use cases, the system 100 can serve to improve safety or security in any of a variety of contexts, including for example the contexts of improving roadside safety, intersection safety, public safety, or indoor security. At the same time, it should be appreciated that the use of the term "safety" or the term "security" herein is not a representation that any of the systems and methods encompassed by the present disclosure will make any environment, circumstance, or process safe or secure, or that other systems will produce unsafe or unsecure operation. Safety or security in any environment, circumstance, or process depends on a wide variety of factors outside of the scope of the present disclosure including, for example, the design, installation, or maintenance of the system and other components/devices interacting with the system, as well as the cooperation, training, or behavior of individuals involved with the system. All physical systems are susceptible to failure and provision must be made for such failure.

Referring still to FIG. 2, upon completion of the step 202, the method proceeds to a step 204 at which several additional configuration selections are made that set or influence the manner of operation of the BS 102 for performing wireless communications and radar sensing. In particular, at the step 204 a mode of operation in a communication protocol is selected. Also a numerology value ($\mu$) and a slot allocation are set for performing wireless communications and radar sensing. For example, a slot allocation (and associated symbol allocations) can be set by selecting from among different available slot formats such as those described in more detail below with respect to FIG. 3B and FIG. 3C. These configuration selections among other things can define or help to define a radar symbol. Further, after the step 204, the method advances to a step 206. At the step 206, the system 100 is configured for both wireless communications and radar sensing.

Further with respect to the configurations of the system 100 performed at the steps 204 and 206 (and particularly the step 206), it should be appreciated that the system 100 in the present embodiment employs time-division duplexing (TDD). In the present example, the TDD framework is defined by Equation (1) based upon the selected numerology value ($\mu$):

$$t_{slot}=1 \text{ ms}/(14*2^{\mu})\sim 71 \text{ }\mu s/2^{\mu} \quad (1)$$

Thus, for example, assuming that the numerology value is six ($\mu=6$), the value of $t_{slot}$ is approximately 1.12 µs. More details regarding the nature of the numerology value and slot (and symbol) allocations that can be selected, and the impacts of those selections upon operation of the system 100, are provided in relation to FIG. 3A, FIG. 3B, FIG. 3C, and FIG. 4.

Next following the step 206, the method proceeds to a step 208, at which the BS 102 of the system 100 transmits signals both for conducting wireless communications and performing radar sensing. The signals that are transmitted at the step 208 can be considered to be signals communicated by the electromagnetic beams 122, and include both first signals (or signal portions) 209 that are DL communication signals as well as second signals (or signal portions) 211 that are for radar sensing purposes. As described in further detail below, the various signals 209 and 211 are transmitted during portions of time slots referred to as symbols, and so the step 208 particularly involves the transmitting of the DL communication signals and radar sensing signals at or during different time periods corresponding to appropriate symbols. The step 208 can be viewed not only as encompassing the transmission of the first signals 209 and second signals 211 by the BS 102, but also the reception of the first signals 209 by one or more of the other communication devices 124, and/or the exposure of the other structures 126 to the second signals 211.

After the step 208, the system 100 also performs a step 210, at which the BS 102 receives signals both for conducting wireless communications and also for performing radar sensing. The signals that are received at the step 210 include third signals (or signal portions) 213 that are UL communication signals as communicated by the additional electromagnetic beams 118. Also, the signals that are received at the step 210 include fourth signals (or signal portions) 215 that are the reflected signals 128 employed for radar sensing. As with the step 208, the various signals 213 and 215 are received during portions of time slots referred to as symbols, and so the step 210 particularly involves the receiving of UL communication signals and radar sensing signals (reflections) at or during different time periods corresponding to appropriate symbols. The step 210 can be viewed not only as encompassing the reception of the third signals 213 and fourth signals 215 by the BS 102, but also the transmission of the third signals 213 by one or more of the other communication devices 124, and/or the reflection of the second signals 211 (as the fourth signals 215/reflected signals 128) that occurs at one or more of the other structures 126.

Although FIG. 2 shows the step 210 as occurring after the step 208, the timing of the transmission and/or reception of the first, second, third, and fourth signals 209, 211, 213, and 215 need not, and typically is not, performed in a manner exactly corresponding to the illustrated ordering of the steps 208 and 210. In particular, as described in further detail below, it should be appreciated that the transmissions of the first signals 209 typically do not occur at the same times as the transmissions of the second signals 211, especially if the same one of the electromagnetic beams 122 is being employed for the transmissions of both types of signals. Rather, at least when being transmitted by the same one of the electromagnetic beams 122, the first signals 209 are typically transmitted at different times than the times at which the second signals 211 are transmitted. Likewise, it should be appreciated that the receptions of the third signals 213 as represented by the step 210 typically occur at different times than receptions of the fourth signals 215.

Additionally, given that (as discussed above) wireless communications between the BS 102 and the other communications devices 124 occurs in a simplex manner but radar sensing between the BS 102 and the other structures 126 occurs in a duplex manner, the receptions of the fourth signals 215 as represented by the step 210 can occur at the same times (or at substantially the same times) as the transmissions of the second signals 211. That is, at least in the present embodiment, the respective transmissions of the respective radar sensing signals by the BS 102 respectively occur simultaneously with (or substantially simultaneously with) the respective receptions of the respective reflected signals 128 resulting from those respective transmissions. In contrast, the respective transmissions by the BS 102 of the respective DL communication signals corresponding to the first signals 209 at the step 208 generally do occur before the respective UL communication signals corresponding to the third signals 213 are respectively received by the BS 102 at the step 210, as the UL communication signals typically are responses by the other communication devices 124 to those respective DL communication signals.

Following the step 210, the process then advances to a step 212, at which the sensing and radar data obtained by the BS 102 at the step 210 is processed. Such processing can occur at the BS 102 or, alternatively, such processing can occur at the cloud 110 after such sensing and radar data is communicated to the cloud from the BS 102. Further, subsequent to the step 212, at a step 214 communication backhaul/image processing (or backend image processing) occurs. Again, such processing can occur at the BS 102 or, alternatively, such processing can occur at the cloud 110.

Finally, at a step 216, data/information obtained as a result of the wireless communication and radar sensing operations of the system 100 and particularly the BS 102, as well as processed data/information generated at the steps 212 and 214, can be stored, further processed, aggregated as "big data" and utilized for any of a variety of user services. Although the step 216 is shown to be the final step of the method of FIG. 2, as represented by an arrow 218 it should be recognized that the method can be ongoing or repeated in terms of the performing of further wireless communication, radar sensing, configuration, and/or processing options, and/or other actions.

Figure 3A:
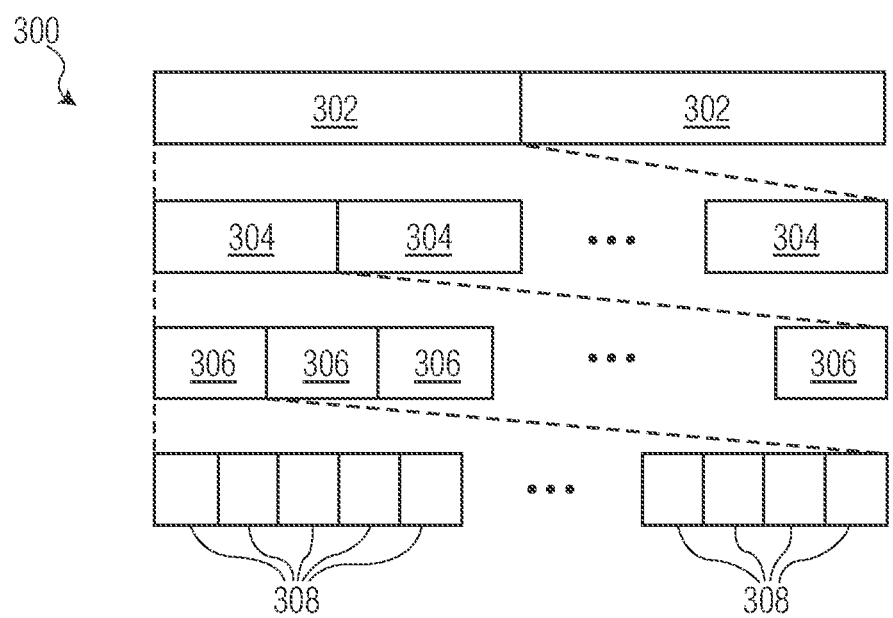
FIG. 3A illustrates figuratively a signal framework (or universal communication framework) concerning time periods at which various operations of the system (and particularly the BS) of FIG. 1 can occur.
Figure 3B:
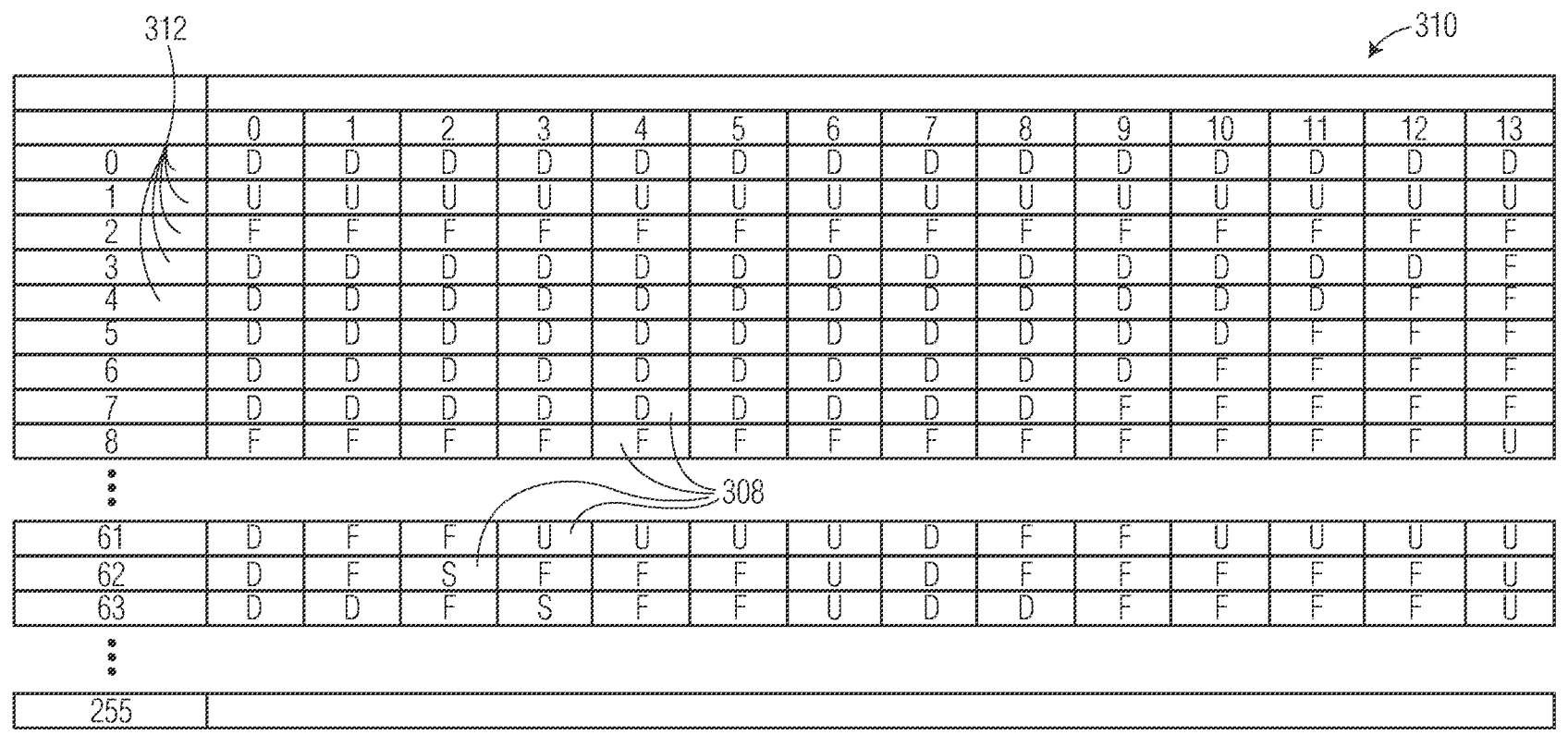
Figure 3C:
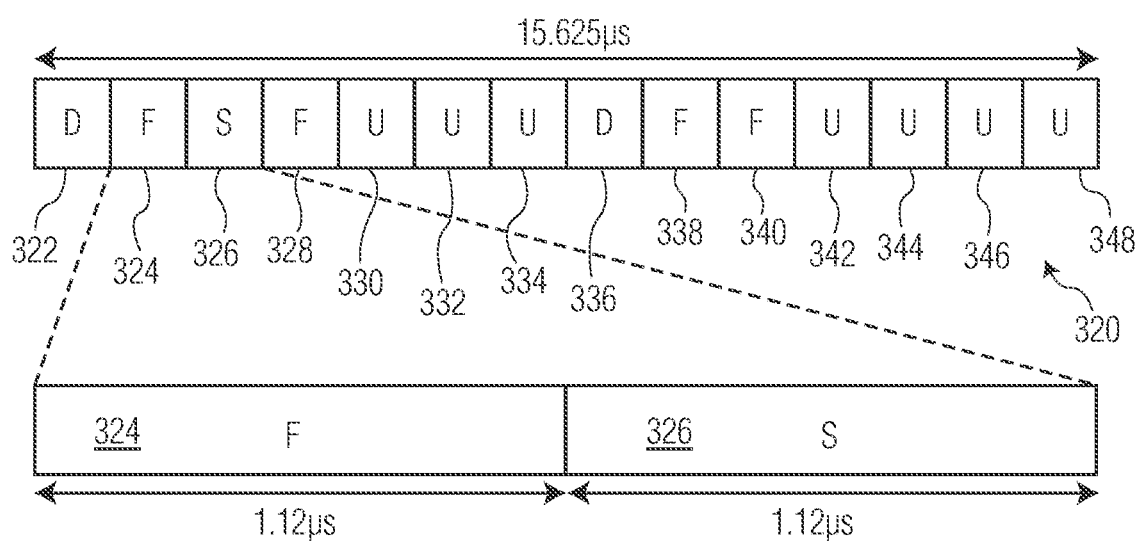
FIG. 3C shows an example row that can constitute one of the rows of the slot format table of FIG. 3B, in which each of four different operation types relating to communication, beam forming, and radar sensing operations has been ascribed to one or more respective symbols.

Turning to FIG. 3A, FIG. 3B, and FIG. 3C, the system 100 can perform wireless communications and radar sensing in a substantially concurrent or contemporaneous manner by interleaving communication and sensing functionality on a sub-frame level. To achieve such functionality, multiple wireless communication operations and radar sensing operations are assigned to be performed during respective time periods within slots, referred to as symbols, in a time-multiplexed manner. The various symbols that are assigned for wireless communication operations and radar sensing operations can be combined in a structured manner, and can be distributed in a variety of different manners. This approach allows for wireless communication symbols and radar sensing symbols, and corresponding wireless communication operations and radar sensing operations, to be dedicated to particular time periods and performed in a flexible manner, so as to fulfill different use case requirements and communication requirements including, for example, achieving maximum latency. Additionally, this approach also allows for flexible modification of the duty cycle of radar sensing and wireless communication operations and thereby enables telecommunications providers to trade off excess communication bandwidth with increased sensing capabilities.

Further in this regard, FIG. 3A illustrates figuratively a signal framework or universal communication framework 300 concerning the time periods at which the various operations of the BS 102 (and also the other communication devices 124) can occur. So as to achieve tight integration into a cellular communication standard (for example, but not limited to, an existing cellular communication standard such as 5G), the framework 300 envisions a high level of segmentation of frames and sub-frames. More particularly as shown, the signal framework 300 includes not only a first level of time portions that are referred to as frames 302 and a second level of time portions that are referred to as sub-frames 304, but also a third level of time portions that are referred to slots 306, and a fourth level of time portions that are referred to as symbols 308. As illustrated figuratively (e.g., by way of dashed lines), each of the frames 302 includes a plurality of the sub-frames 304, each of the sub-frames includes a plurality of the slots 306, and each of the slots includes a plurality of the symbols 308. Thus, the segmentation of the framework 300 is increased into the slots 306 and symbols 308 thereof (the so-called multiplicity or numerology value µ).

The respective amounts of time that are ascribed to each of the frames 302, sub-frames 304, slots 306, and symbols 308 can vary depending upon the embodiment (for example, in one embodiment, each of the frames 302 can be 1 millisecond in length). Nevertheless, in the present embodiment, the symbols 308 included by each of the slots 306 are set to have temporal lengths that are particularly suited for radar sensing. In particular, the length of time of each of the symbols 308 is set to fit the radar sequence or chirp length.

This can be achieved by either choosing the closest multiplicity so that a pulse sequence or chirp fits exactly (which might require adjusting the radar parameters) or by dividing it into smaller chunks and aggregating multiple symbols into one pulse sequence or chirp.

By leveraging a cellular communication standard's flexible slot ("F" slot) allocation and/or designating a new allocation for sensing, one or more of the symbols 308 of a given one of the slots 306 can be allocated for radar sensing operations (or, as will be discussed below, related beam formation), while others of the symbols (e.g., the remaining time within the given slot) can be allocated for wireless communications (e.g., for DL or UL communications). The allocation of the symbols 308 for wireless communication operations or radar sensing operations (or beam formation operations) can vary significantly depending upon the embodiment or circumstance.

As an example, FIG. 3B shows an example slot format table 310 that includes a plurality of rows 312 having different example arrangements of the symbols 308. Each of the plurality of rows 312 more particularly shows a respective different arrangement, or slot format, of several of the symbols 308 that defines a different series of operations to be performed (where each of the symbols corresponds to a respective operation of the series of operations). Any of the arrangements of the symbols 308 shown in any of the rows 312 can be selected and implemented for any given one of the slots 306 (e.g., any of the successively-performed ones of the slots as illustrated in FIG. 3A) during operation of the system 100 including the BS 102 thereof. If a given one of the arrangements/slot formats corresponding to a given one of the rows 312 is selected to be implemented during a given one of the slots 306, then the respective operations corresponding to the respective symbols 308 of that row 312 will be performed sequentially in accordance with that arrangement/slot format, during the time period portions of the slot that respectively correspond to those symbols.

In the present example, the slot format table 310 shows slot formats that are consistent with a numerology value of six ($\mu=6$) as mentioned above. Consequently, in this example, each of the rows 312 of the slot format table 310 includes an arrangement of fourteen (14) of the symbols 308, which in the slot format table are ascribed slot numbers 0 through 13. With each of the slots 306 having a time length of 15.625 μs, each of the symbols 308 has a time length ($t_{slot}$) of 1.12 μs (that is, one-fourteenth of the time length of one of the slots). Further in the present example, the slot format table 310 includes 256 (two-hundred and fifty-six) rows having row or slot format numbers 0 through 255 (the slot format table is shown in cutaway to particularly reveal the rows with format numbers 0 to 8, 61 to 63, 254, and 255). It should be recognized that, if the numerology value is different, then one or more aspects of the slot format table will typically also be different from what is shown in FIG. 3B. For example, if the numerology value is four ($\mu=4$), then each of the slots 306 can alternatively having a time length of 62.5 μs and each of the symbols 308 can have a time length ($t_{slot}$) of 4.46 μs.

Additionally as shown in FIG. 3B, each of the symbols 308 can involve any of four types of operations. A first of these four types of operations is a transmission operation suitable for sending a wireless communication signal from the BS 102 to the other communication devices 124, that is, sending a DL communication signal as described in regard to the step 208 of FIG. 2. Each of the symbols 308 in the slot format table 310 that is allocated for this purpose is marked with a "D" (for DL/downlink). A second of these four types of operations is a reception operation suitable for receiving a wireless communication signal from one or more of the other communication devices 124 with which the BS 102 is in communication, that is, receiving an UL communication signal as described in regard to the step 210 of FIG. 2. Each of the symbols 308 in the slot format table 310 that is allocated for this purpose is marked with a "U" (for UL/uplink).

A third of these four types of operations is a sensing operation in which the BS 102 is operated both to send out a radar sensing signal as described in regard to the step 208 of FIG. 2, and also to receive any of the reflected signals 128 as described in regard to the step 210 of FIG. 2. Each of the symbols 308 in the slot format table 310 that is allocated for this purpose is marked with a "S" (for sensing). Additionally, a fourth of these four types of operations can be referred to as a flexible operation. The flexible operation often can be (or include) a beam forming operation in which the BS 102 operates to reconfigure one or more of the electromagnetic beams 122 so that the beam(s) is or are suitable for performing one or more of the aforementioned transmission/DL communication (D), reception/UL communication (U), or sensing (S) operations. In the present embodiment, the flexible operation usually (or possibly always) involves a beam forming operation when the flexible operation is performed in relation to (e.g., just prior to) the performing of radar sensing. However, in other circumstances (e.g., if a change to an electromagnetic beam is unnecessary), the flexible operation can involve the performing of one or more other operation(s) (or no operation) including, for example, any of the aforementioned transmission/DL communication (D), reception/UL communication (U), or sensing (S) operations. Each of the symbols 308 in the slot format table 310 that is allocated as a flexible operation is marked with a "F" (for flexible).

The slot format table 310 of FIG. 3B illustrates numerous different slot formats or arrangements that set forth numerous different series or patterns of operations that can be selected and performed within a given one of the slots 306 during operation of the system 100 (and particularly the BS 102). In the present example embodiment, each of the symbols 308 in the rows 312 having format numbers 0 through 61 can only be ascribed an operation that is one of the transmission/DL communication (D) operation, the reception/UL communication (U) operation, or the flexible (F) operation (which, as discussed above, often includes a beam forming operation, especially in the context of radar sensing). In contrast, each of the symbols 308 in the rows 312 having format numbers 62 through 254 can be ascribed an operation that is any of the four types of operations mentioned above, that is, any of the transmission/DL communication (D) operation, the reception/UL communication (U) operation, the flexible (F) operation, or the sensing (S) operation. Also, one or more of the rows 312 can be reserved—for example, in this embodiment, the row 312 having format number 255 is reserved, such that the row has not been ascribed any of the symbols 308.

The slot formats listed in the rows of any given slot format table such as the slot format table 310 can vary significantly depending upon the embodiment or circumstance. Also, the process for, or bases for, specifying slot formats or selecting slot formats can vary significantly depending upon the embodiment or circumstance. For example, in some embodiments or circumstances, a user can determine the slot format for a given one of the slots 306 based on tdd-UL-DL ConfigurationCommon, or tdd-ULDL-ConfigurationDedicated and, if any, on detected DCI formats.

FIG. 3C is provided to illustrate an example assignment of operations to the symbols 308 for an example one of the rows 312 of the slot format table 310, shown as a row 320. The row 320 can be one of the rows 312 of the slot framework table 310 having any of format numbers 64 through 254 that is not particularly shown in FIG. 3B. In this example, it can be seen that the row 320 includes an arrangement of fourteen of the symbols 308 in which a respective one or more of the symbols has been ascribed each of the four types of operations mentioned above. In this example, first and eighth symbols 322 and 336 of the row 320 respectively are assigned respective transmission/DL communication (D) operations. Additionally, fifth, sixth, seventh, eleventh, twelfth, thirteenth, and fourteenth symbols 330, 332, 334, 342, 344, 346, and 348 of the row 320 respectively are assigned respective reception/UL communication (U) operations. Further, second fourth, ninth, and tenth symbols 324, 328, 338, and 340 of the row 320 respectively are assigned respective flexible (F) operations. Finally, a third symbol 326 of the row 320 is assigned a sensing (S) operation.

As illustrated in FIG. 3C, each of the symbols 308 of the row 320—including each of the second and third symbols 324 and 326, which are also shown in an enlarged manner—has a time length ($t_{slot}$) of 1.12 µs, and all fourteen of the symbols 308 in combination form an overall slot having a time length of 15.625 µs. Further, it should be recognized that the assignment of flexible (F) operations to the second and fourth symbols 324 and 328 is purposeful in view of the assignment of a sensing (S) operation to the third symbol 326. Indeed, typically it is necessary to allocate some time for configuration/adjustment of the electromagnetic beam(s) 122 to perform radar sensing when, at previous or subsequent times, the electromagnetic beam(s) are configured to perform transmission/DL communication (D) or reception/UL communication (U) operations.

Figure 4:
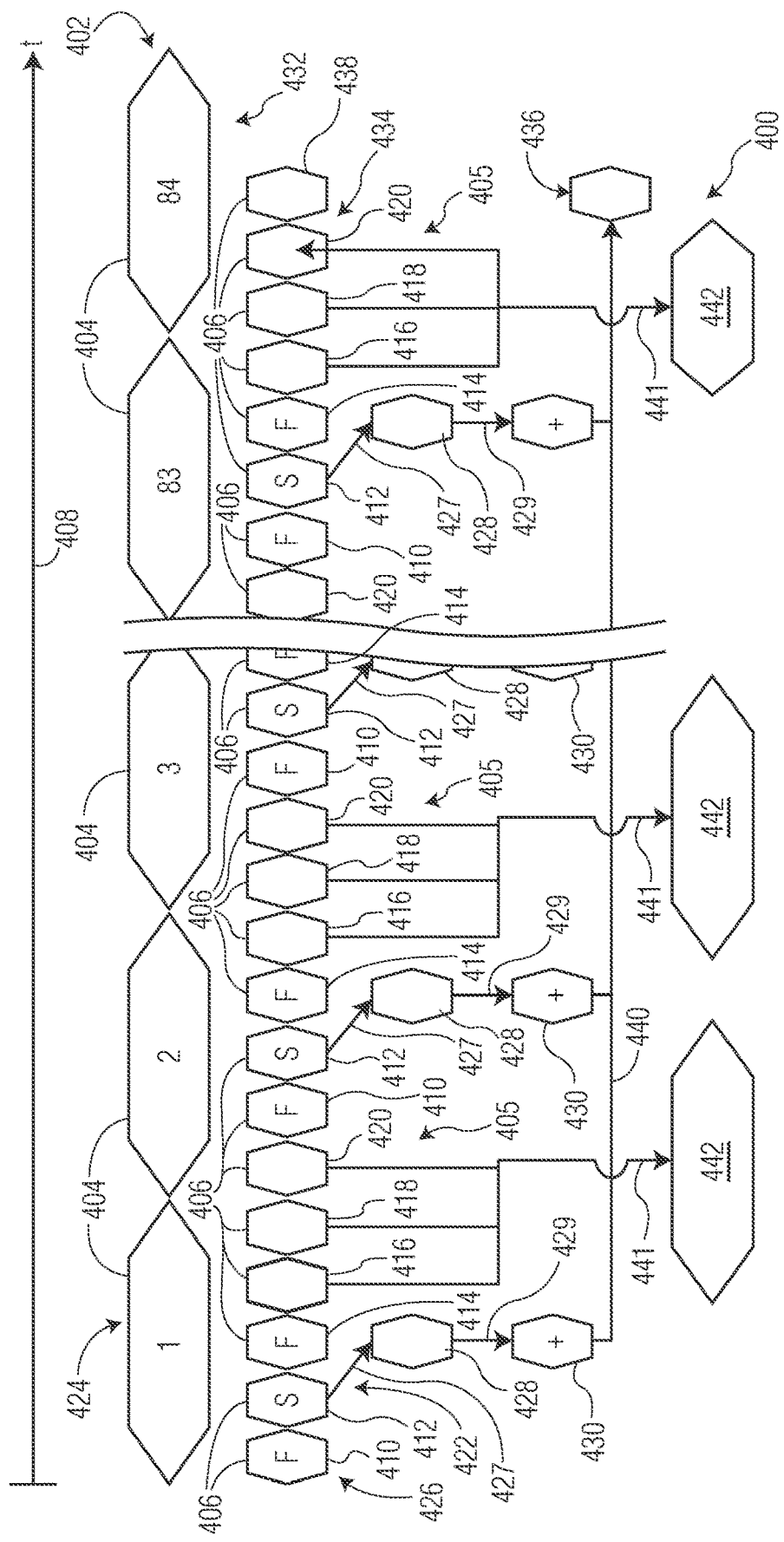
FIG. 4 is a timing diagram showing how the system (and particularly the BS) of FIG. 1 operates temporally, in accordance with slots and symbols thereof, to perform both wireless communications and radar sensing in combination.

Turning to FIG. 4, a timing diagram 400 shows in more detail how the system 100 and particularly the BS 102 thereof can operate during a single sub-frame 402, in accordance with a series of slots 404 and symbols 406 thereof, to perform both wireless communication and radar sensing operations in combination, in a substantially concurrent or contemporaneous manner. As discussed, the applicable wireless communication standard and numerology, as well as the numbers of the sub-frames 304, slots 306, and symbols 308 that are respectively included within given ones of the frames 302, sub-frames, and slots, respectively, can vary depending upon the embodiment or circumstance. In the present example, the timing diagram 400 of FIG. 4 shows operation for an embodiment of the system 100 and BS 102 in which the applicable communication standard is 6G, and in which the numerology value is six ($\mu=6$) in this example. Additionally, the timing diagram 400 illustrates an example embodiment in which the single sub-frame 402 (as well as other sub-frames occurring prior to and subsequent to that sub-frame, which are not shown) is defined to include eighty-four (84) of the slots 404, and each of those slots is defined to include five (5) of the symbols 406.

The timing diagram 400 particularly illustrates how the system 100 and particularly the BS 102 perform successive operations corresponding to successive ones of the symbols 406 (performed within successive ones of the slots 404 within the sub-frame 402) as time elapses as indicated by a time axis 408. To allow for illustration of the sub-frame 402 in its entirety, a segment of the timing diagram (between the third and eighty-third ones of the slots 404) is removed, as indicated by break lines. In the present embodiment, the system 100 and BS 102 perform both wireless communication operations and radar sensing operations by temporally interleaving the radar sensing operations in between the wireless communication operations (and vice-versa) on a periodic basis. To achieve such interleaving, successive ones of the symbols 406 follow a recurring pattern according to which the symbols associated with particular types of operations are repeated with a periodicity of M symbols.

The periodicity of the operations can vary depending upon the embodiment or circumstance, and can be chosen to suit a use case. In the present example the periodicity involves recurring groups 405 of six (6) of the symbols, such that M=6. Each of the groups 405 of the symbols 406 particularly includes a respective first symbol 410 at which a respective flexible (F) operation is performed, a respective second symbol 412 at which a sensing (S) operation is performed, a respective third symbol 414 at which a respective further flexible (F) operation is performed, and respective fourth, fifth, and sixth symbols 416, 418, and 420, respectively, at which wireless communication operations are performed. The respective wireless communication operations that are performed at any of the fourth, fifth, and sixth symbols 416, 418, and 420 can be either a transmission/DL communication (D) operation or a reception/UL communication (U) operations. The flexible (F) operations that are performed at either of the first symbol 410 and third symbol 414 can be (or include) beam forming operations.

It should be noted that the periodicity of operations that are performed, in terms of the number of the symbols 406 comprised by each of the groups 405 of the symbols, need not particularly bear any relation to the time length of the slots 404. Although the periodicity of operations can potentially be set so that each of the recurring groups of the symbols would be equal in length to the time length of one of the slots 404, this need not be the case—and in the particular example of FIG. 4 this is not the case. Rather, in the example of FIG. 4, the time length of each of the symbols 406 is equal to one-fifth of the time length of each of the slots 404, and thus the operations associated with each of the groups 405 of the symbols will take place over 6/5 of the time of a given one of the slots. For this reason, in the embodiment of FIG. 4, the relative positioning of the first, second, third, fourth, fifth, and sixth symbols 410, 412, 414, 416, 418, and 420 relative to portions of the slots 404 varies depending upon the slot.

In the present embodiment, radar sensing not only involves performing the sensing (S) operations at regular time intervals in accordance with the periodicity of the groups 405 of the symbols, but also involves accumulating sensed information over a particular number of periods. By performing radar sensing at such regular time intervals a particular number (N) of times (that is, over N periods), sufficient information can be obtained and processed so as to allow for accurate sensing to be achieved in terms of accurately determining positions and/or movements of detected objects. As with the length of time ascribed to each of the symbols 406 (and slots 404, sub-frames 402, etc.) and the periodicity of the groups 405, the number of periods (N) over which radar sensing is performed in order to obtain sufficient information can depend upon a variety of considerations including the use case and anticipated behavior of intended targets (e.g., anticipated speed of movement of the other structures 126).

FIG. 4 further illustrates example processing that is performed by the system 100 and BS 102 thereof to achieve such accurate sensing, as well as to conduct wireless communications. Although FIG. 4 envisions such processing operations as being performed by the system 100 and particularly the BS 102 thereof, in some alternate embodiments, other systems or devices such as the cloud 110 can perform (or assist with performing) such processing operations. In the present embodiment as shown, radar sensing (S) operations are performed at the second symbols 412 of the groups 405 of the symbols 406. In the example shown, a first one 422 of the second symbols 412, which occurs during a first one 424 of the slots 406, is the second one of the symbols 406 that are shown in FIG. 4, occurring immediately after a first one 426 of the first symbols 410. The others of the second symbols 412 occur periodically (in this example, every six symbols) after the first one 422 of the second symbols. From a nomenclature standpoint, the times at which the radar sensing (S) operations associated with the second symbols 412 occur can be times referred to by the following sequence: 2, M+2, 2*M+2, ... N*M+2, where M=6 and N is the number of radar sensing operations that are performed in order to achieve desired sensing accuracy.

Further as illustrated in FIG. 4, to make use of the information obtained at the radar sensing operations occurring at the second symbols 412, the system 100 and BS 102 thereof additionally perform radar signal processing that includes both correlation processing and accumulation processing. Again, in some alternate embodiments, other systems or devices such as the cloud 110 can perform (or assist with performing) such processing operations. In the present example, the correlation processing and accumulation processing is performed repeatedly, in accordance with the periodicity of the groups 405. The correlation processing and accumulation processing particularly occurs at respective times that correspond to the times of the respective third symbols 414 of each of the groups 405 (and that immediately follow the times of the respective second symbols 412). The correlation processing is performed based upon the data received from the radar sensing operations, and the accumulation processing is based upon the results of the correlation processing. The correlation and accumulation processing operations can generally be viewed as corresponding to the step 212 of FIG. 2.

For illustrative purposes, FIG. 4 represents the performing of correlation processing as a series of correlation processing symbols (or icons) 428, and represents the performing o accumulation processing as a series of accumulation processing symbols (or icons) 430. The respective correlation processing symbols 428 are respectively positioned below the respective third symbols 414, indicating that the correlation processing occurs periodically at the times of those respective third symbols. Likewise, the respective accumulation processing symbols 430 are respectively positioned below the respective correlation processing symbols 428, so as to indicate that the accumulation processing also occurs periodically at the times of the respective third symbols 414. Further, first arrows 427 between the respective third symbols 414 and the respective correlation processing symbols 428 indicate that the correlation processing is performed based upon the data received from the radar sensing operations, and second arrows 429 between the respective correlation processing symbols 428 and respective accumulation processing symbols 430 indicate that the accumulation processing is based upon the correlation processing results.

Finally, after all (all N) of the successive radar sensing operations have been performed, and after all corresponding correlation processing and accumulation processing operations have been performed, then the system 100 (and BS 102 thereof) performs further processing so as to generate radar sensing output data. In the present embodiment, this further processing can again be considered to be something which occurs during the step 212 of FIG. 2 and particularly involves performing a Doppler (slow) FFT based upon all of the accumulated, correlated, radar sensing data obtained over the N periods. In the present example, the Nth (final) one of the groups 405 of the symbols 406 concludes during a final one 432 (that is, the eighty-fourth one) of the slots 404 of the sub-frame 402, such that a final one 434 of the sixth symbols 420 occurs during that final one 432 of the slots 404. So that the radar sensing output data is based upon all of the accumulated, correlated, radar sensing data obtained over the N periods, the further processing is performed after the final one 434 of the sixth symbols 420.

For purposes of illustration, FIG. 4 represents this further processing involving the Doppler (slow) FFT by way of a FFT processing symbol (or icon) 436. The FFT processing symbol 436 is particularly shown to be positioned below an extra symbol 438 that immediately follows the final one 434 of the sixth symbols 420, to illustrate that the further processing involving the performing of the FFT occurs at a time immediately following the final one 434 of the sixth symbols 420. Also as illustrated by arrows 440 linking each of the accumulation processing symbols 430 with the FFT processing symbol 436, the further processing involving the Doppler (slow) FFT is based upon all of the accumulated, correlated, radar sensing data obtained over the N periods. The operation of the Doppler (slow) FFT can be represented by the expression $(N_{fft2}-1)*M+2$—again, as already discussed, M is the periodicity of the symbols setting the frequency with radar sensing operations occur in time and N is the number of radar sensing operations that are taken into account in generating the radar sensing output data.

As mentioned, FIG. 4 also illustrates wireless communication operations and associated processing. As already noted, the respective wireless communication operations are performed repeatedly during the time periods of the fourth, fifth, and sixth symbols 416, 418, and 420, and can be either transmission/DL communication (D) or reception/UL communication (U) operations. FIG. 4 particularly shows that these wireless communication operations are performed with the same periodicity as the radar sensing and beam formation operations (in this example, a periodicity in which M=6). Just as the radar sensing (S) operations (and beam formation (F) operations) are interleaved with the wireless communication operations, likewise the wireless communication operations are interleaved with the radar sensing (S) operations. Thus, the operation of the system 100 (and BS 102 thereof) generally involves alternatingly performing radar sensing (S) operations and wireless communication (D or U) operations, with beam formation (F) operations therebetween (further, as noted above, in some alternate embodiments, such operations additionally or instead can be performed by the cloud 110).

At the same time, it should be appreciated that the relative proportion of wireless communication (D or U) operations performed by the system 100 (and BS 102) is higher than the relative proportion of radar sensing (S) operations. In the present example of FIG. 4, this is evident insofar as each of the groups 405 of the symbols 406 includes three symbols at which communication operations are performed (the fourth, fifth, and sixth symbols 416, 418, and 420) but only one symbol at which a radar sensing (S) operation is performed (the second symbol 412 of each of the groups 405). In other embodiments, this relative proportion of the wireless communication operations relative to the radar sensing (S) operations can be different from that illustrated in FIG. 4 and, for example, can be even more heavily weighted in favor of wireless communication operations.

In the present example embodiment, the respective fourth, fifth, and sixth symbols 416, 418, and 420 of each of the groups 405 at which wireless communication operations take place occur immediately in succession with one another. Thus, in this embodiment, wireless communication processing not only is performed periodically during each of the groups 405 (again having periodicity M), but also the wireless communication processing performed during any given period takes into account all of the wireless communication operations that occur during that period. FIG. 4 illustrates this manner of operation by showing a series of wireless communication processing symbols (or icons) 442 that are positioned below the respective sixth symbols 416. Respective arrows 441 link each of the respective wireless communication processing symbols 442 for each of the groups 405 to each of the fourth, fifth, and sixth symbols 416, 418, and 420 of the respective group 405. Thus, FIG. 4 shows that the respective wireless communication processing that occurs during each time period associated with each of the groups 405 (again, with periodicity M) is based upon all of the wireless communication operations that occur during that respective time period.

Although the timing diagram of FIG. 4 illustrates one example manner of operation of the system 100 (and BS 102 thereof) in accordance with the method of FIG. 2, the present disclosure is intended to include additional manners of operation as well. As already noted above, although the operations discussed with reference to FIG. 4 can be performed by the system 100 and particularly the BS 102 thereof, in alternate embodiments encompassed herein, one or more of these operations can be performed by one or more other systems or devices such as the cloud 110. In some such alternate embodiments, to achieve such operations by way of the cloud 110, one or more additional operations can be taken—for example, to fully offload such operations into the cloud 110, it can be appropriate or necessary to add additional synchronization information into the frames, e.g., as an extension of the correlation processing (e.g., as represented by the icons 428).

Additionally, it should be appreciated that the timing diagram of FIG. 4 particularly pertains to the system 100 and BS 102 (and/or, in alternate embodiments, one or more other systems or devices such as the cloud 110) in an embodiment or circumstance in which radar sensing is only directed to occur in a single (first) direction, for example, because only a single one of the electromagnetic beams 122 is employed. Nevertheless, it should be further appreciated that in other embodiments or circumstances the system 100 and BS 102 can operate to perform radar sensing that is directed to occur in multiple directions. Typically during such operation the radar sensing in multiple directions is achieved by way of multiple ones of the electromagnetic beams 122 although, in some embodiments or circumstances, such radar sensing in multiple directions is achieved by way of a single one of the electromagnetic beams (e.g., a single beam directed at different times in different directions).

Figure 5:
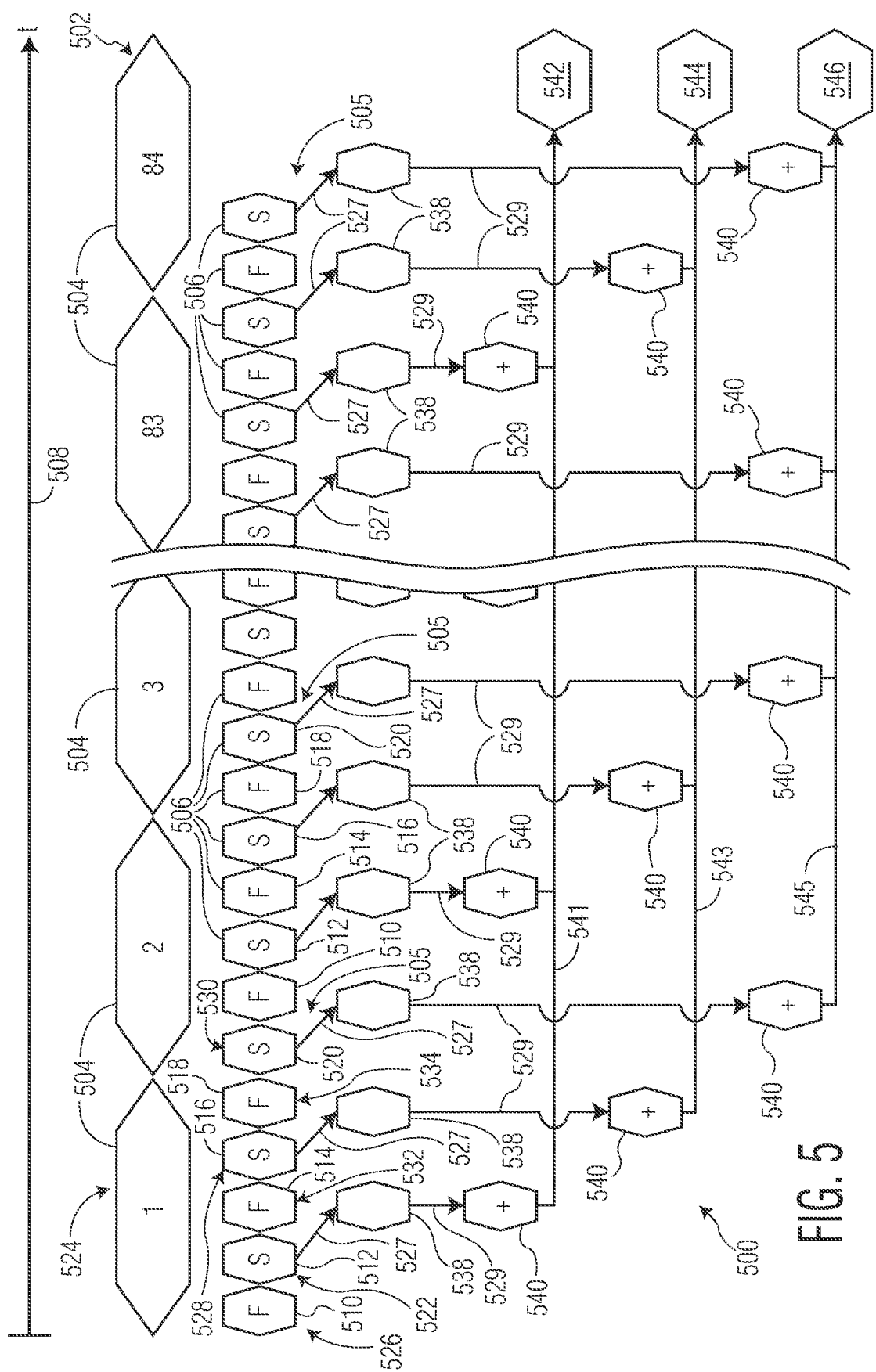
FIG. 5 is a timing diagram showing how the system (and particularly the BS) of FIG. 1 operates temporally, in accordance with slots and symbols thereof, in an alternate manner differing from that of FIG. 4, to perform radar sensing including sensing in multiple directions.

Further in this regard, FIG. 5 provides a timing diagram 500 that shows how the system 100 and particularly the BS 102 thereof can operate, in an alternate manner differing from that represented by FIG. 4, to perform radar sensing that involves sensing in multiple directions. The timing diagram 500 particularly illustrates operation during a time period associated with a single sub-frame 502, where that sub-frame (as well as other sub-frames occurring prior to and subsequent to that sub-frame, which are not shown) is defined to include eighty-four (84) slots 504, and each of those slots is defined to include five (5) symbols 506. The timing diagram 500 illustrates how the system 100 and particularly the BS 102 perform successive operations corresponding to successive ones of the symbols 506 (performed within successive ones of slots 504) as time elapses as indicated by a time axis 508. The timing diagram 500 particularly shows operation for an embodiment of the system 100 and BS 102 in which the applicable communication standard is 6G and the numerology value is four ($\mu=4$). To allow for illustration of the sub-frame 502 in its entirety, a segment of the timing diagram 500 (between the third and eighty-third slots) is removed, as indicated by break lines.

When operating in accordance with FIG. 5, the system 100 (and BS 102 thereof) perform operations at times corresponding to the symbols 506 again (as in the embodiment of FIG. 4) in accordance with a periodicity that involves recurring groups 505 of six (6) of the symbols, such that M=6. However, in this embodiment, each of the groups 505 of the symbols 506 particularly includes respective first, third, and fifth symbols 510, 514, and 518 at which respective first, second, and third flexible (F) operations are respectively performed, and also includes respective second, fourth, and sixth symbols 512, 516, and 520 at which respective first, second, and third radar sensing (S) operations are respectively performed. Given that the flexible (F) operations performed at the first, third, and fifth symbols 510, 514, and 518 respectively each precede respective radar sensing (S) operations (performed at the second, fourth, and sixth symbols 512, 516, and 520, respectively), each of those first, second, and third flexible (F) operations particularly can be (or include) respective beam forming operations. Also, in this embodiment, the first, second, and third radar sensing (S) operations respectively are performed in first, second, and third directions, respectively, via three different ones of the electromagnetic beams 122, respectively.

FIG. 5 also illustrates processing that is performed by the system 100 (and BS 102) thereof to achieve accurate sensing. As already mentioned, the first radar sensing (S) operations are performed at the second symbols 512 of the groups 505 of the symbols 506. In the example shown, a first one 522 of the second symbols 512, which occurs during a first one 524 of the slots 506, is the second one of the symbols 506 that are shown in FIG. 5, occurring immediately after a first one 526 of the first symbols 510. The others of the second symbols 512 occur periodically (in this example, every six symbols) after the first one 522 of the second symbols. From a nomenclature standpoint, the times at which the first radar sensing (S) operations associated with the second symbols 512 occur can be times referred to by the following sequence: 2, M+2, 2*M+2, ... N*M+2, where M=6 and N is the number of radar sensing operations that are performed in order to achieve desired sensing accuracy.

By comparison, the second radar sensing (S) operations and third radar sensing (S) operations respectively are performed at the fourth symbols 516 and the sixth symbols 520, respectively, of the groups 505 of the symbols 506. In the illustration provided, respective first ones 528 and 530 of the fourth and sixth symbols 516 and 520, respectively, are the fourth and sixth ones of the symbols 506 that are shown in FIG. 5, occurring immediately after respective first ones 532 and 534 of the third and fifth symbols 514 and 518, respectively. The others of the fourth symbols 516 occur periodically (every six symbols) after the first one 528 of the fourth symbols, and likewise the others of the sixth symbols 520 occur periodically (every six symbols) after the first one 530 of the sixth symbols. From a nomenclature standpoint, the times at which the second and third radar sensing (S) operations respectively associated with the fourth and sixth symbols 516 and 520 respectively occur can be times referred to by the following sequences: 4, M+4, 2*M+4, . . . N*M+4, and 6, M+6, 2*M+6, . . . N*M+6, where M=6 and N is the number of radar sensing operations that are performed in order to achieve desired sensing accuracy in each different direction.

Further as illustrated in FIG. 5, immediately following each of the first, second, and third radar sensing (S) operations occurring at the second symbols 512, fourth symbols 516, and sixth symbols 520, respectively, the system 100 (and BS 102 thereof) performs correlation processing and accumulation processing of the sensed information. In the present example, the correlation processing and accumulation processing is performed repeatedly, in accordance with the periodicity of the groups 505. The correlation processing is performed based upon the data received from the radar sensing operations, and the accumulation processing is based upon the results of the correlation processing. The correlation and accumulation processing operations can generally be viewed as corresponding to the step 212 of FIG. 2.

In contrast the manner of operation illustrated by FIG. 4, the correlation processing and accumulation processing performed in FIG. 5 concerning the radar sensing information occurs multiple times relative to each of the groups 405 of the symbols 406, in response to each of the first, second, and third radar sensing (S) operations that occur during each of the groups 505 of the symbols 506. That is, three sets of correlation processing and accumulation processing operations are performed with respect to the three different sets of radar sensing (S) operations that occur during each of the groups 505 (in three different directions).

For illustrative purposes, FIG. 5 represents the performing of correlation processing as a series of correlation processing symbols (or icons) 538, and represents the performing of accumulation processing as a series of accumulation processing symbols (or icons) 540. The respective correlation processing symbols 538 are respectively positioned below the respective third symbols 514, fifth symbols 518, and first symbols 510, indicating that the correlation processing occurs periodically at the times of those respective symbols in response to the receiving of radar sensing information at the times of preceding ones of the second symbols 512, fourth symbols 516, and sixth symbols 520, respectively. Likewise, the respective accumulation processing symbols 540 are respectively positioned below the respective correlation processing symbols 538, so as to indicate that the accumulation processing also occurs periodically at the times of the respective third symbols 514, fifth symbols, and first symbols 510. (Notwithstanding the above discussion, with respect to the correlation and accumulation processing performed in regard to the radar sensing data obtained during the time period of the final one of the sixth symbols 520 during the final (eighty-fourth) one of the slots 504, this correlation and accumulation processing can be performed immediately after the final one of the sixth symbols as illustrated in FIG. 5 rather than at the time of any of the first symbols 510).

Further, first arrows 527 extend between the respective second symbols 512, fourth symbols 516, and sixth symbols 520, at which radar sensing information is received, and the respective correlation processing symbols 538 positioned below the respective third symbols 514, fifth symbols 518, and first symbols 510. The first arrows 527 indicate that the correlation processing is performed during the times of the respective symbols 514, 518, and 510 based upon the data received from the radar sensing operations performed at the times of the immediately-preceding ones of the symbols 512, 516, and 520, respectively. Likewise, second arrows 529 extend between the respective correlation processing symbols 538 and respective accumulation processing symbols 540. The second arrows 529 indicate that the accumulation processing occurring during the times of the respective symbols 514, 518, and 510 is based upon the correlation processing results also generated during the times of those symbols. (Again, notwithstanding the above discussion, with respect to the correlation and accumulation processing performed in regard to the radar sensing data obtained during the time period of the final one of the sixth symbols 520 during the final (eighty-fourth) one of the slots 504, this correlation and accumulation processing is performed immediately following the final one of the sixth symbols rather than at the time of any of the first symbols 510).

Finally, after all (all N) of the successive sets of first, second, and third radar sensing operations have been performed (at all N of each of the second, fourth, and sixth symbols 512, 516, and 520), and after all corresponding correlation processing and accumulation processing operations have been performed, then the system 100 (and BS 102 thereof) performs further processing so as to generate radar sensing output data. In the present embodiment, this further processing can again be considered to be something which occurs during the step 212 of FIG. 2. In contrast to the manner of operation shown in FIG. 4, however, when radar sensing information has been obtained from three sets of radar sensing operations oriented in three different directions as in FIG. 5, the further processing involves performing three different Doppler (slow) FFTs that are respectively based upon all of the accumulated, correlated, radar sensing data obtained over the N periods with respect to the three different directions, respectively.

All of the further processing involving the three different Doppler (slow) FFTs can be performed, as shown in FIG. 5, immediately after the final correlation processing and accumulation processing operations have been performed with respect to the radar sensing data obtained at the final one of the sixth symbols 520. For purposes of illustration, FIG. 5 represents this further processing involving the three Doppler (slow) FFTs by way of first, second, and third FFT processing symbols (or icons) 542, 544, and 546, respectively. As shown, the first FFT processing symbol 542 is linked by arrows 541 from each of the accumulation processing symbols 540 that represent accumulation processing based upon (after correlation processing) the radar sensing information obtained at the second symbols 512. In contrast, the second and third FFT processing symbols 544 and 546 are respectively linked by arrows 543 and 545, respectively, to each of the accumulation processing symbols 540 that represent accumulation processing based upon (after correlation processing) the radar sensing information obtained at the fourth and sixth symbols 516 and 520, respectively.

The operation of the three Doppler (slow) FFTs corresponding to the first, second, and third FFT processing symbols 542, 544, and 546, respectively, can be represented by the expressions $(N_{fft2}-1)*M+2$, $(N_{fft2}-1)*M+4$, and $N_{fft2}*M$, respectively. Again, as already discussed, M is the periodicity of the symbols setting the frequency with radar sensing operations occur in time and N is the number of radar sensing operations that are taken into account in generating the radar sensing output data. The resulting output information generated from the first, second, and third FFTs (again as represented by the symbols 542, 544, and 546) can in turn be combined and/or further processed so as to arrive at additional output information. For example, in some embodiments or circumstances or in connection with some use cases, the resulting output information generated from all of the first, second, and third FFT operations can be indicative of the position or movement of a particular object that is moving through an overall region encompassing three respective subregions toward which are respectively directed the three different ones of the electromagnetic beams 122 employed to perform the first, second, and third radar sensing (S) operations, respectively.

In the embodiment of FIG. 5, none of the operations performed at the symbols 506 are operations that involve transmission/DL communication (D) operations or reception/UL communication (U) operations. This is in contrast with the embodiment of FIG. 4, in which communication operations are performed at each of the fourth, fifth, and sixth symbols 416, 418, and 420. Nevertheless, it should be appreciated that the present disclosure is intended to encompass additional embodiments and implementations in which the system 100 and BS 102 not only perform radar sensing operations in multiple directions as described in regard to FIG. 5, but also interleave such radar sensing operations among communication operations as described in regard to FIG. 4. For example, although the timing diagram 500 of FIG. 5 does not show the combined performing of both communications and radar sensing operations, it should be appreciated that in alternate embodiments or circumstances, the recurring groups 505 of the symbols 506 can be enlarged to include additional symbols (e.g., where M>6), where one or more of those additional symbols concern transmission/DL communication (D) operations or reception/UL communication (U) operations.

Figure 6:
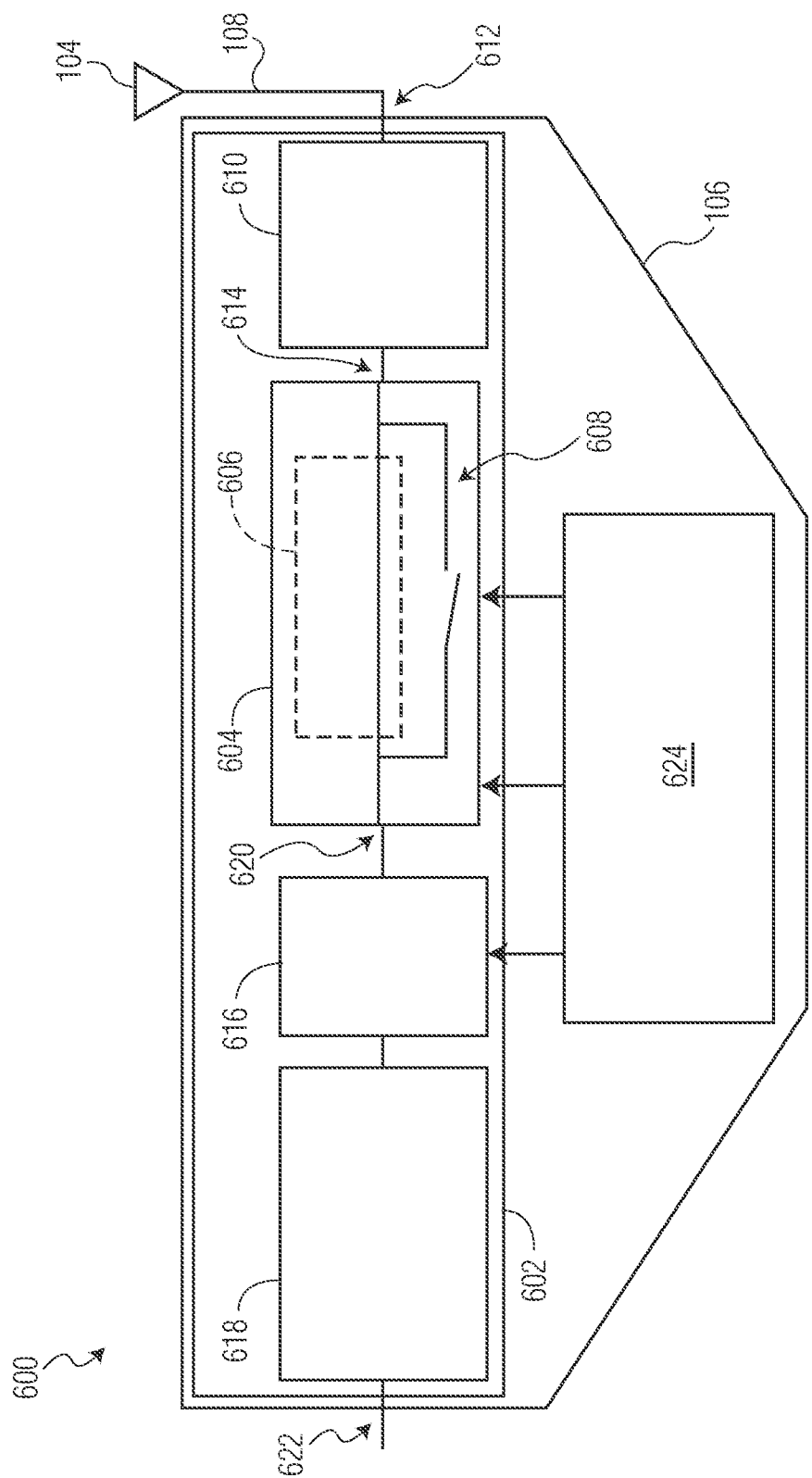
FIG. 6 is a block diagram showing in more detail portions of the system (and particularly the BS) of FIG. 1 that allow for the performing, and bypassing, of spillover cancellation operations depending upon whether communication or radar sensing operations are occurring.

Turning to FIG. 6, as mentioned above, the RRU 106 allows for spillover cancellation operation as well as spillover cancellation bypass operation. To achieve such operations, as shown by a block diagram 600 provided in FIG. 6, the RRU 106 in the present embodiment includes reception (Rx) circuit components 602 that include a controllable circuit 604. The controllable circuit 604 particularly includes a spillover cancellation circuit 606 and also a bypass circuit (or a bypass switch or bypass circuitry) 608. In the present example embodiment, the reception circuit components 602 of the RRU 106 also include a RF to BB (baseband) conversion unit 610 coupled between an input port 612 of the RRU 106 and an input terminal 614 of the controllable circuit 604. By way of the RF to BB conversion unit 610, RF signals received at the input port 612 from the AiP devices 104 via the one or more communication links 108 are converted into BB signals. The BB signals in turn are communicated from the RF to BB conversion unit 610 to the controllable circuit 604. It should be appreciated that the RF to BB conversion unit 610 is optional and need not be included in alternate embodiments.

As additionally shown by the block diagram 600, the reception circuit components 602 of the RRU 106 further include a programmable amplifier 616 and a digitizer 618. The digitizer 618 is a generic digitizer that can take any of a variety of forms such as, for example, an analog-to-digital converter (ADC). The programmable amplifier 616 can for example be a variable gain amplifier (VGA). The programmable amplifier 616 is coupled between an output terminal 620 of the controllable circuit 604 and the digitizer 618, and the digitizer 618 is coupled between the programmable amplifier 616 and an output port 622. Although the output port 622 in FIG. 6 is illustrated as being an output port for the RRU 106 as a whole, this need not be the case. Rather, the output port 622 is intended to be representative of any port or terminal within or associated with the RRU 106 from which output signals provided by the digitizer 612 can be communicated or provided, for use by other portions of the RRU or other components, devices, or systems.

Further as shown, the RRU 106 also includes a controller 624 that provides control signals and serves to control one or more operations of several of the reception circuit components 602. The controller 624 can take any of a variety of forms and can include any of a variety of components depending upon the embodiment including, for example, any of a microprocessor, a modem, or an edge processing device. Although the controller 624 is shown in the present embodiment to be part of the RRU 106, in other embodiments, the controller need not be part of the RRU but rather can be distinct from the RRU, for example, as another unit or component of the BS 102. Also, in one or more embodiments, the control functions performed by the controller 624 illustrated in FIG. 6 (e.g., with respect to controlling one or more operations of several of the reception circuit components 602) can be performed by a controller, computer, or other control device located remotely from the BS 102, such as the cloud 110.

In the present embodiment, the controller 624 serves to control the configuration and bypass operations of the controllable circuit 604, and also serves to control gain setting(s) of the programmable amplifier 616. With respect to the controllable circuit 604, the controller 624 particularly provides control signals that control the operation of the bypass circuit 608, which is displayed as being coupled in parallel with (or coupled around) the spillover cancellation circuit 606. By dynamically controlling the bypass circuit 608, the controllable circuit 604 operates to perform spillover cancellation by way of the spillover cancellation circuit 606 or refrains from doing so, due to the spillover cancellation circuit being bypassed by the bypass circuit 608.

In the present embodiment, the controller 624 governs operation of the controllable circuit 604 so that the controllable circuit (or at least the bypass circuit 608 thereof) operates differently depending upon whether the system 100 and BS 102 are operating in a radar sensing mode or in a communication mode (during which either transmission/DL communication (D) or reception/UL communication (U) operations is or are occurring). When the system 100 and BS 102 are operating in a communication mode, the controller 624 causes bypass circuit 608 of the controllable circuit 604 to bypass the spillover cancellation circuit 606 and also to reset the spillover cancellation circuit. Alternatively, when the system 100 and BS 102 are operating in a radar sensing mode, the controller 624 causes the controllable circuit 604 to operate to enable the spillover cancellation circuit 606 such that spillover cancellation is provided.

Enablement of the spillover cancellation circuit 606 during the radar sensing mode enhances radar sensing performance. Indeed, when the programmable amplifier 616 (e.g., VGA) is configured to fit a spillover false target, real targets can be lost in the noise. Therefore, during radar sensing mode, the controller 624 stops operation of the bypass circuit 608, such that the spillover cancellation circuit 606 (serving as a spillover, false target canceller) is effectively added in front of the programmable amplifier 616, so as to process the received radar sensing signal information before that signal information is provided to the programmable amplifier.

The hardware implementation of the bypass circuit 608 can be, but is not limited to, a simple transmission gate. Although the bypass circuit 608 is illustrated as being coupled in parallel with the spillover cancellation circuit 606, the present disclosure is intended to encompass alternate embodiments in which a bypass circuit is implemented in combination with a spillover cancellation circuit so that, in some operational circumstances, the spillover cancellation circuit ceases to function or have any impact upon the signals output at the output terminal 620 (or at the output port 622 or at another location). In at least some embodiments, the bypass circuit 608 of the controllable circuit 604 simply operates to directly couple the input terminal and output terminal (e.g., the input and output terminals 614 and 620) of the controllable circuit with one another so those two terminals constitute the same or substantially the same electrical node. Further, it should be appreciated that, although the present description envisions that the bypass circuit 608 and spillover cancellation circuit 606 are included in the controllable circuit 604, the controller 624 can be in communication with one or both of the bypass circuit and spillover cancellation circuit without there being any controllable circuit of which the bypass circuit and spillover cancellation circuit form parts.

Figure 7:
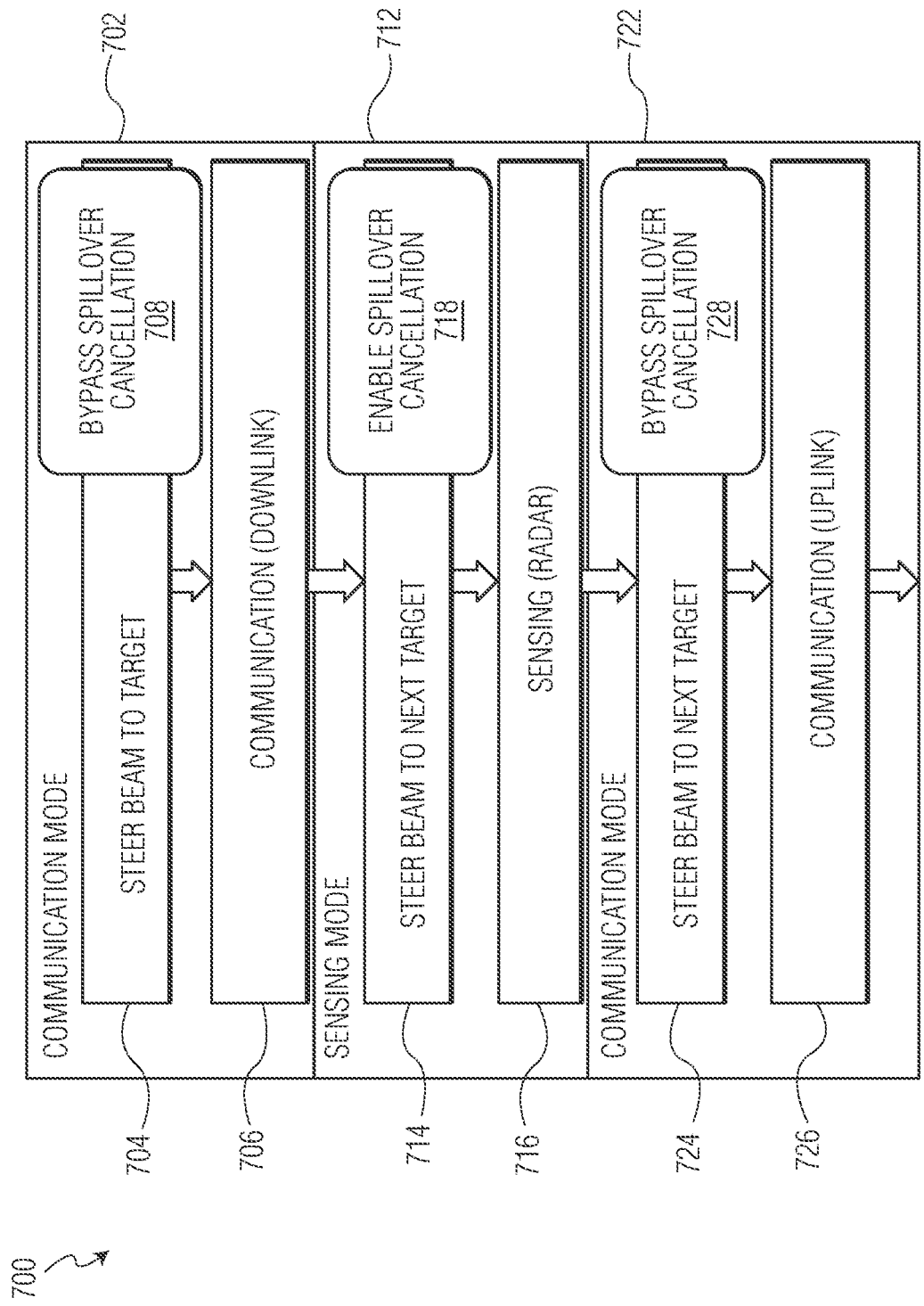
FIG. 7 is a flow chart showing example steps of a method of operation of the system of FIG. 1, and particularly the portions of that system that are shown in FIG. 6, according to which the system performs, as well as bypasses, spillover cancellation operations.

Referring additionally to FIG. 7, a flow chart 700 is provided to show an example method (or process) of operation of the system 100 and particularly the BS 102 thereof, in which spillover cancellation is selectively performed by the RRU 106 during radar sensing operation but not during communication operation. As shown in the flow chart 700, in the present example, the method begins at a first step 702 in which the system 100/BS 102 can be considered to be operating in a communication mode of operation.

The first step 702 includes a first substep 704 at which one of the electromagnetic beams 122 is steered toward a target, as well as a second substep 706 at which transmission/DL communication (D) operation occurs. The first substep 704 can be considered to include one of the flexible (F) operations described above in regard to FIG. 3B, FIG. 3C, FIG. 4, and FIG. 5 and to correspond to one of the symbols 308 at which such flexible (F) operations are performed (e.g., the third symbols 414 of FIG. 4). The second substep 706 can be considered to include one of the transmission/DL communication (D) operations described above in regard to FIG. 3B, FIG. 3C, FIG. 4, and FIG. 5 and to correspond to one of the symbols 308 at which such communication operations are performed (e.g., the first symbol 322 of FIG. 3C). As further shown by a first block 708, substantially at or during the time at which the first substep 704 is being performed, the controller 624 causes the bypass circuit 608 of the controllable circuit 604 to be actuated. Consequently, when transmission/DL communication (D) operation occurs at the second substep 706, no spillover cancellation occurs.

Following the first step 702 is a second step 712, in which the system 100/BS 102 can be considered to be operating in a radar sensing mode of operation. The second step 712 includes a third substep 714 at which one of the electromagnetic beams 122 is steered toward a next target, as well as a fourth substep 716 at which radar sensing operation occurs. The third substep 714 can be considered to include one of the flexible (F) operations described above in regard to FIG. 3B, FIG. 3C, FIG. 4, and FIG. 5 and to correspond to one of the symbols 308 at which such flexible (F) operations are performed. The fourth substep 716 can be considered to include one of the radar sensing (S) operations described above in regard to FIG. 3B, FIG. 3C, FIG. 4, and FIG. 5 and to correspond to one of the symbols 308 at which such radar sensing operations are performed (e.g., the third symbol 326 of FIG. 3C). Additionally, given that the fourth substep 716 particularly involves one of the radar sensing (S) operations, the flexible (F) operation performed at the third substep 714 can be (or include) a beam forming operation. Also, as further shown by a second block 718, substantially at or during the time at which the third substep 714 is being performed, the controller 624 causes the bypass circuit 608 of the controllable circuit 604 to be deactivated. Consequently, when radar sensing operation occurs at the fourth substep 716, spillover cancellation occurs.

Subsequent to the second step 712, a third step 722 is performed, in which the system 100/BS 102 can be considered to be operating again in a communication mode of operation. The third step 722 includes a fifth substep 724 at which one of the electromagnetic beams 122 is steered toward a next target, as well as a sixth substep 726 at which communication operation occurs. The fifth substep 724 can be considered to include one of the flexible (F) operations described above in regard to FIG. 3B, FIG. 3C, FIG. 4, and FIG. 5 and to correspond to one of the symbols 308 at which such operations are performed. At the sixth substep 726 (in contrast to the second substep 706), reception/UL communication (U) operation occurs rather than transmission/DL communication (D) operation. Thus, the sixth substep 726 can be considered to include one of the reception/UL communication (U) operations described above in regard to FIG. 3B, FIG. 3C, FIG. 4, and FIG. 5 and to correspond to one of the symbols 308 at which such communication operations are performed (e.g., the fifth symbol 330 of FIG. 3C). As further shown by a third block 728, substantially at or during the time at which the fifth substep 724 is being performed, the controller 624 causes the bypass circuit 608 of the controllable circuit 604 to be actuated again. Consequently, when reception/UL communication (U) operation occurs at the sixth substep 726, no spillover cancellation occurs.

Although the flow chart 700 of FIG. 7 particularly shows the method as having only the first, second, and third steps 702, 712, and 722, where the communication operations are performed during the first step 702 and third step 722 and the radar sensing operation is performed during the second step 712, the present disclosure is not limited to methods having this particular number or sequence of steps (and substeps and/or blocks as shown in FIG. 7). Rather, the present disclosure also encompasses numerous other methods in which any number of steps (and substeps and/or blocks) having any number or arrangement of communications and radar sensing operations are performed. In at least some such other embodiments, consistent with what is shown in FIG. 7, spillover cancellation operation can be bypassed when a flexible (F) operation is performed prior to a transmission/DL communication (D) or reception/UL communication (U) operation, and spillover cancellation operation can be enabled when a flexible (F) operation (which, in this circumstance, typically involves a beam forming operation) is performed prior to a radar sensing (S) operation.

Notwithstanding the above description, the present disclosure is intended to encompass numerous embodiments including those disclosed herein as well as a variety of alternate embodiments. For example, although the above description primarily discusses performing radar sensing, the present disclosure envisions employing other types of wireless sensing technologies instead of radar. Also, the present disclosure is intended to include any of a variety of embodiments of wireless systems that the perform wireless communication and radar (or other wireless) sensing in combination, and not merely wireless systems having BSs. Further, although phase modulated continuous waveform (PMCW) radar technology is employed in the above-described embodiments, the present disclosure is not limited to this radar waveform and, in alternate embodiments, other sensing schemes (e.g., other analog or digital sensing schemes) can be employed, as long as timing restrictions are met.

Also, notwithstanding any description provided above, the present disclosure is intended to encompass any of a variety of implementations in which one or more operations (e.g., the correlation or accumulation processing, or spillover cancellation bypass operations) of the system 100 or BS 102 thereof are performed by any of a variety of hardware devices and/or devices employing software. For example, the controllable circuit 604 (or one or more portions thereof, such as the bypass circuit 608 and/or the spillover cancellation circuit 606) can be implemented by way of discrete hardware devices or implemented using software. The present disclosure envisions different embodiments that utilize any of a variety of different control, processing, and/or monitoring devices, systems, or arrangements including, for example, discrete circuit elements, programmable logic devices (PLDs), microprocessors, or controllers or computer devices employing software programming to perform various functions.

Additionally, at least some embodiments of the systems and methods encompassed herein can be implemented in a wide variety of current and future products that integrate sensing (e.g., radar sensing) and wireless communication capabilities (for example, including products operating in accordance with 5G or next generation 6G communication standards). Further for example, embodiments of the systems and methods encompassed by the present disclosure can be implemented in or in combination with (or utilize) Layerscape® processors or modem products (for example, Layerscape LA1200 modem product portfolio, where reception/RX base baseband processing is located) as are available from NXP Semiconductors N.V. of Eindhoven, Netherlands, and/or implemented together with edge products (e.g., edge processors) and AiP products (or other antenna products) to provide BS solutions for network operators.

Further, in at least one example embodiment encompassed herein, the present disclosure relates to a method of performing both wireless communications and wireless sensing in combination by way of a wireless system. The method comprising sending, from a first antenna device of a base station (BS), a first plurality of wireless transmissions respectively during a first plurality of time periods associated respectively with a first plurality of symbols comprised by a first slot that is a portion of a frame in accordance with a communication standard. The first plurality of wireless transmissions includes a first wireless communication signal sent during a first one of the first plurality of time periods, and a first wireless sensing signal sent during a second one of the first plurality of time periods. The method also includes receiving at the first antenna device a second wireless sensing signal, also during the second one of the first plurality of time periods, where the second wireless sensing signal is at least partly a first reflection of the first wireless sensing signal off of a first object. The method additionally includes receiving at the first antenna device a second wireless communication signal during a third one of the first plurality of time periods. The method further includes additionally sending, from the first antenna device of the base station (BS), an additional wireless communication signal at an additional time period, the additional time period being associated with an additional symbol either of the first plurality of symbols or of a second plurality of symbols. The second one of the first plurality of time periods occurs between the additional time period and one or both of the first one and third one of the first plurality of time periods, whereby one or more wireless sensing operations including the sending of the first wireless sensing signal and receiving of the second wireless sensing activity occur, by way of the first antenna device, in between multiple wireless communication operations including the additional sending of the additional wireless communication signal and one or both of the sending of the first wireless communication signal and the receiving of the second wireless communication signal.

In at least one additional example embodiment, the present disclosure relates to a method of performing both wireless communications and wireless sensing in combination by way of a wireless system. The method includes sending, from a first antenna device of a base station (BS), a plurality of first wireless communication signals respectively during a first plurality of time periods associated respectively with a first plurality of symbols and also a plurality of first wireless sensing signals respectively during a second plurality of time periods associated respectively with a second plurality of symbols. The method additionally includes receiving, at the first antenna device, a plurality of second wireless communication signals respectively during a third plurality of time periods associated respectively with a third plurality of symbols and also a plurality of second wireless sensing signals respectively during the second plurality of time periods substantially as respective reflections of the first wireless sensing signals respectively. The second plurality of time periods during which the respective first wireless sensing signals are sent and during which the respective second wireless sensing signals are received are interleaved among respective pairs of the first plurality of time periods during which the first wireless communication signals are sent.

In at least one further example embodiment, the present disclosure relates to a system for performing both wireless communications and wireless sensing in combination. The system includes a base station (BS) including each of at least one antenna device including a first antenna device and at least one control unit coupled at least indirectly to the at least one antenna device. The BS is configured to operate the first antenna device to send a first plurality of wireless transmissions respectively during a first plurality of time periods associated respectively with a first plurality of symbols comprised by a first slot that is a portion of a frame in accordance with a communication standard, where the first plurality of wireless transmissions includes a first wireless communication signal sent during a first one of the first plurality of time periods, and a first wireless sensing signal sent during a second one of the first plurality of time periods. The BS is additionally configured to operate the first antenna device to receive at the first antenna device a second wireless sensing signal, also during the second one of the first plurality of time periods, and also to receive a second wireless communication signal during a third one of the first plurality of time periods, where the second wireless sensing signal is at least partly a first reflection of the first wireless sensing signal off of a first object. The BS is further configured to operate the first antenna device to additionally send an additional wireless communication signal at an additional time period, the additional time period being associated with an additional symbol either of the first plurality of symbols or of a second plurality of symbols. The second one of the first plurality of time periods occurs between the additional time period and one or both of the first one and third one of the first plurality of time periods, whereby one or more wireless sensing operations including the sending of the first wireless sensing signal and receiving of the second wireless sensing activity occur, by way of the first antenna device, in between multiple wireless communication operations including the additional sending of the additional wireless communication signal and one or both of the sending of the first wireless communication signal and the receiving of the second wireless communication signal.

In at least one additional example embodiment, the present disclosure relates to a system for performing both wireless communications and wireless sensing in combination. The system includes a base station (BS) including each of at least one antenna device including a first antenna device and at least one control unit coupled at least indirectly to the at least one antenna device. The control unit includes an input port coupled at least indirectly to the first antenna device, an output port, and a controllable circuit including each of a spillover cancellation circuit and a bypass circuit, where the controllable circuit is coupled at least indirectly between the input port and output port. The BS is configured to operate in each of a communication mode and a sensing mode. When the BS operates in the sensing mode, the spillover cancellation circuit of the controllable circuit is enabled and performs spillover cancellation in generating the output signal based at least in part upon the input signal, and when the BS operates in a communication mode, the bypass circuit operates so that the spillover cancellation circuit is bypassed or otherwise does not affect how the output signal is generated based at least in part upon the input signal.

In at least one further example embodiment, the present disclosure relates to a method of performing both wireless communications and wireless sensing in combination by way of a wireless system. The method includes, during a communication mode of operation, first causing a spillover cancellation circuit within a control unit of a base station (BS) to be bypassed by way of actuating a bypass circuit, and performing a first wireless communication operation by way of a first antenna device of a base station (BS). The method further includes, during a sensing mode of operation, enabling the spillover cancellation circuit by ceasing a bypassing of the spillover cancellation circuit by the bypass circuit, and performing a first wireless sensing operation by way of the first antenna device. The method also includes, upon returning to the communication mode of operation, further causing the spillover cancellation circuit within the control unit of the base station (BS) to be bypassed, and performing a second wireless communication operation by way of the first antenna device.

In at least one additional example embodiment, the present disclosure relates to a method of performing both wireless communications and wireless sensing in combination by way of a wireless system. The method includes sending, from a first antenna device of a base station (BS), a first plurality of wireless transmissions respectively during a first plurality of time periods associated respectively with a first plurality of symbols comprised by a first slot that is a portion of a frame in accordance with a communication standard. The first plurality of wireless transmissions includes a first wireless communication signal sent during a first one of the first plurality of time periods, and a first wireless sensing signal sent during a second one of the first plurality of time periods. The method additionally includes receiving at the first antenna device a second wireless sensing signal, also during the second one of the first plurality of time periods, where the second wireless sensing signal is at least partly a first reflection of the first wireless sensing signal off of a first object. The method also includes receiving at the first antenna device a second wireless communication signal during a third one of the first plurality of time periods. During the second one of the first plurality of time periods, the BS is operating in a sensing mode of operation during which a spillover cancellation circuit of a control unit of the BS is active. Also, during the first one and the third one of the first plurality of time periods, the BS is operating in a communication mode of operation during which the spillover cancellation circuit of the control unit is disabled due to being bypassed by a bypass circuit of the control unit.

One or more of the embodiments encompassed herein can be advantageous in any of a variety of respects. In at least some embodiments, the present disclosure relates to new methods of operating a wireless system to perform both wireless communication and radar sensing in combination, in a substantially concurrent or contemporaneous manner. Further, in at least some embodiments, the methods encompassed herein include a new method of time interleaving communication and sensing slots, or portions of slots (e.g., symbols), in a structured manner such that a compromise can be achieved in this situation, allowing for both good communication quality and also sensing to be achieved over a complete FOV of a BS. Indeed, at least some methods encompassed herein are optimized methods of interleaving radar sensing and wireless communication in a communication frame so as to fulfill both sensing goals or requirements (e.g., in terms of range and/or speed) for a preselected use case and also to maintain high-quality wireless communications (e.g., in terms of low latency).

At least some such methods are advantageous further because the methods allow for the same HW (for example, the same BS, transceiver, transmitter, or receiver) to be employed for both of radar sensing and wireless communication operating modes. Indeed, at least some embodiments encompassed herein can be viewed a system solution (e.g., which is tied to the operating mode of the BS, with a control signal to the receiver) and/or a HW solution (e.g., resettable high-pass filter at the receiver side).

Further, in at least some embodiments encompassed herein, the present disclosure relates to a method of adapting a BS parameter (e.g., power or phase) during radar time slots (or portions of slots) to allow for improved or optimal radar sensing operation, for a BS that also performs wireless communication in combination with radar sensing. In at least some such embodiments, transmitted power can be increased to increase detection range, or decreased to save power consumption, with this depending on the required radar link budget (e.g., in relation to the system signal-to-noise ratio appropriate for a reliable detection, which can be modulation dependent). Additionally, in at least some embodiments, the proposed methods allow for reducing BS loading to acceptable levels, making it possible for telecommunications system operators to offer sensing services with low impact on the communication link and resource (time or frequency).

Also, in at least some such embodiments, the transmitted phase of a BS can be changed in a dynamic way to focus the electromagnetic beams of the BS in different directions and within a given time, to be able to scan a complete FOV over a defined system duty cycle (time). The phase during the radar sensing time is decorrelated from communication phase (or beam focus) that is "locked" to a user or user equipment (UE). Further, at least some embodiments encompassed herein relate to methods of operating a BS beam former so that a transmitted beam is focused and locked onto UE during a communication operation within a communication slot (UE involved). Additionally, at least some embodiments encompassed herein relates to methods in which a transmitted beam is changing its direction and searching for reflections from a target (or different targets) in a predefined FOV in a passive way (no communication with the target, no UE involved), during a radar time slot allocated within the communication frame/sub-frame.

Additionally, at least some embodiments of the present invention are advantageous insofar as the embodiments allow for a single system to perform both wireless communication and radar sensing operations notwithstanding concerns about false reflections due to cross coupling that can result in false sensing of targets during radar sensing operations. In at least some such embodiments, system or method features are employed by which spillover cancellation is performed during radar sensing operation but also is bypassed or disabled during wireless communication operation. By virtue of such operation, in which spillover cancellation is enabled or disabled depending upon whether radar sensing or wireless communication operations are occurring at any particular times, both accurate radar sensing and high quality wireless communication can be achieved.

Systems and methods for performing both wireless communications and wireless sensing in combination are disclosed herein. In one example embodiment, the system includes a base station (BS) including each of at least one antenna device including a first antenna device and at least one control unit. The control unit includes an input port coupled at least indirectly to the first antenna device, an output port, and a controllable circuit including each of a spillover cancellation circuit and a bypass circuit. The BS is configured to operate in each of a communication mode and a sensing mode. When the BS operates in the sensing mode, the spillover cancellation circuit of the controllable circuit is enabled and performs spillover cancellation. When the BS operates in a communication mode, the bypass circuit operates so that the spillover cancellation circuit is bypassed or otherwise does not affect how the output signal is generated.

While the principles of the invention have been described above in connection with specific apparatus, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A system for performing both wireless communications and wireless sensing in combination, the system comprising:
a base station (BS) including each of at least one antenna device including a first antenna device and at least one control unit coupled at least indirectly to the at least one antenna device, wherein the control unit includes:
an input port coupled at least indirectly to the first antenna device;
an output port; and
a controllable circuit including each of a spillover cancellation circuit and a bypass circuit, wherein the controllable circuit is coupled at least indirectly between the input port and output port;
wherein the BS is configured to operate in each of a communication mode and a sensing mode,
wherein, when the BS operates in the sensing mode, the spillover cancellation circuit of the controllable circuit is enabled and performs spillover cancellation in generating the output signal based at least in part upon the input signal, and
wherein, when the BS operates in a communication mode, the bypass circuit operates so that the spillover cancellation circuit is bypassed or otherwise does not affect how the output signal is generated based at least in part upon the input signal.

2. The system of claim 1, wherein the control unit additionally includes a radio frequency (RF) to baseband (BB) conversion unit coupled between the input port of the control unit and an input terminal of the controllable circuit.

3. The system of claim 2 wherein the control unit additionally includes an amplifier coupled at least indirectly between the output port and an output terminal of the controllable circuit.

4. The system of claim 3, wherein the amplifier is a programmable amplifier.

5. The system of claim 1, wherein the control unit further includes a digitizer coupled at least indirectly between the output port and the output terminal, wherein the amplifier is coupled between the digitizer and the output terminal, and the digitizer is coupled between the amplifier and the output port.

6. The system of claim 1, wherein the control unit is a remote radio unit (RRU) that includes one or both of a modem and an edge processing device.

7. The system of claim 1, wherein the at least one antenna device includes a plurality of Antenna-in-Package (AiP) devices, and a first one of the AiP devices includes the first antenna device.

8. The system of claim 1, wherein the bypass circuit is coupled in parallel with the spillover cancellation circuit within the controllable circuit and, depending upon an actuation state of the bypass circuit, the spillover cancellation circuit is enabled or disabled in terms of whether the spillover cancellation circuit affects how the output signal is generated based at least in part upon the input signal.

9. The system of claim 1, wherein first operations by the BS in the communication mode include sending a first plurality of wireless communication signals respectively during a first plurality of time periods associated respectively with a first plurality of symbols, and additionally include receiving a second plurality of wireless communication signals respectively during a second plurality of time periods associated with a second plurality of symbols; and
wherein second operations by the BS in the sensing mode include sending a first plurality of wireless sensing signals respectively during a third plurality of time periods associated respectively with a third plurality of symbols, and further include receiving a second plurality of wireless sensing signals respectively during the third plurality of time periods.

10. The system of claim 9, wherein each of the wireless sensing signals of the first plurality of wireless sensing signals and the second plurality of wireless sensing signals is a respective radar signal.

11. A method of performing both wireless communications and wireless sensing in combination by way of a wireless system, the method comprising:
during a communication mode of operation,
first causing a spillover cancellation circuit within a control unit of a base station (BS) to be bypassed by way of actuating a bypass circuit, and
performing a first wireless communication operation by way of a first antenna device of a base station (BS);
during a sensing mode of operation, enabling the spillover cancellation circuit by ceasing a bypassing of the spillover cancellation circuit by the bypass circuit, and performing a first wireless sensing operation by way of the first antenna device; and upon returning to the communication mode of operation, further causing the spillover cancellation circuit within the control unit of the base station (BS) to be bypassed, and performing a second wireless communication operation by way of the first antenna device.

12. The method of claim 11, wherein the first wireless communication includes a downlink (DL) communication operation, and wherein the second wireless communication operation includes an uplink (UL) communication operation.

13. The method of claim 12, wherein the first causing of the spillover cancellation circuit to be bypassed by way of actuating a bypass circuit during the communication mode of operation occurs during a first time at which a first beam steering operation occurs.

14. The method of claim 13, wherein the enabling of the spillover cancellation during the sensing mode of operation occurs during a second time at which a second beam steering operation occurs, and wherein the further causing of the spillover cancellation circuit to be bypassed occurs during a third time at which a third beam steering operation occurs.

15. The method of claim 12, wherein the performing of the first wireless sensing operation includes actuating the first antenna device to direct a first electromagnetic beam toward a first object and receiving at least one reflected signal reflected at least partly off of the first object at the first antenna device.

16. A method of performing both wireless communications and wireless sensing in combination by way of a wireless system, the method comprising:

sending, from a first antenna device of a base station (BS), a first plurality of wireless transmissions respectively during a first plurality of time periods associated respectively with a first plurality of symbols comprised by a first slot that is a portion of a frame in accordance with a communication standard, wherein the first plurality of wireless transmissions includes a first wireless communication signal sent during a first one of the first plurality of time periods, and a first wireless sensing signal sent during a second one of the first plurality of time periods;

receiving at the first antenna device a second wireless sensing signal, also during the second one of the first plurality of time periods, wherein the second wireless sensing signal is at least partly a first reflection of the first wireless sensing signal off of a first object; and receiving at the first antenna device a second wireless communication signal during a third one of the first plurality of time periods;

wherein, during the second one of the first plurality of time periods, the BS is operating in a sensing mode of operation during which a spillover cancellation circuit of a control unit of the BS is active, and wherein, during the first one and the third one of the first plurality of time periods, the BS is operating in a communication mode of operation during which the spillover cancellation circuit of the control unit is disabled due to being bypassed by a bypass circuit of the control unit.

17. The method of claim 16, wherein the control unit includes a controllable circuit that includes both the spillover cancellation circuit and the bypass circuit coupled at least indirectly between input and output ports of the controllable circuit.

18. The method of claim 17, wherein the control unit additionally includes a radio frequency (RF) to baseband (BB) conversion unit coupled between the input port of the control unit and an input terminal of the controllable circuit.

19. The system of claim 18 wherein the control unit additionally includes an amplifier coupled at least indirectly between the output port and an output terminal of the controllable circuit.

20. The system of claim 19, wherein the control unit further includes a digitizer coupled at least indirectly between the output port and the output terminal, wherein the amplifier is coupled between the digitizer and the output terminal, and the digitizer is coupled between the amplifier and the output port.

* * * * *